(12) United States Patent
Takahashi

(10) Patent No.: US 7,228,019 B2
(45) Date of Patent: Jun. 5, 2007

(54) MULTI-CHANNEL MACH-ZEHNDER INTERFEROMETER TYPE OPTICAL CIRCUITS FOR RESTRAINING HEAT INTERFERENCE OF ADJACENT CHANNEL

(75) Inventor: Morio Takahashi, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 10/994,705

(22) Filed: Nov. 22, 2004

(65) Prior Publication Data
US 2005/0111778 A1   May 26, 2005

(30) Foreign Application Priority Data
Nov. 25, 2003 (JP) .............................. 2003-394310

(51) Int. Cl.
*G02B 6/26* (2006.01)
(52) U.S. Cl. .............................. 385/14; 385/39; 385/40
(58) Field of Classification Search .................... None
See application file for complete search history.

(56) References Cited

U.S. PATENT DOCUMENTS 6,895,157 B2* 5/2005 Toofan et al. .............. 385/129
6,922,422 B2* 7/2005 Peters et al. ................. 372/36
2003/0095736 A1* 5/2003 Kish et al. ..................... 385/14
2004/0258344 A1* 12/2004 Fardi et al. .................... 385/14

FOREIGN PATENT DOCUMENTS

| EP | 0 837 352 A2 | 4/1998 |
| JP | 61151628 A * | 7/1986 |
| JP | 01-158413 | 6/1989 |
| JP | 1-158413 | 6/1989 |
| JP | 2002-169130 | 6/2002 |
| JP | 2002-359694 | 12/2002 |
| JP | 2004-013737 | 1/2004 |
| WO | WO 02/44777 A1 | 6/2002 |

* cited by examiner

*Primary Examiner*—Sarah Song
(74) *Attorney, Agent, or Firm*—Scully, Scott, Murphy & Presser, P.C.

(57) ABSTRACT

In the Mach-Zehnder interferometer type optical circuit in which a plurality of Mach-Zehnder interferometers have been provided, between the Mach-Zehnder interferometers a and b, there are provided a plurality of grooves 27(a–b)1, 27(a–b)2 and an endothermic wall 28(a–b). Since heat generated from the temperature control device 25a mounted on the waveguide arm of the Mach-Zehnder interferometer a is absorbed by the endothermic wall 28(a–b), an influence due to heat interference to be exerted on the Mach-Zehnder interferometer b is restrained.

8 Claims, 21 Drawing Sheets

MULTI-CHANNEL MACH-ZEHNDER INTERFEROMETER TYPE OPTICAL CIRCUITS FOR RESTRAINING HEAT INTERFERENCE OF ADJACENT CHANNEL

FIELD OF THE INVENTION

The present invention relates to a multi-channel Mach-Zehnder interferometer type optical circuit, and more particularly to a multi-channel Mach-Zehnder interferometer type optical circuit miniaturized and highly integrated as compared with the prior art for restraining an influence of heat interference.

DESCRIPTION OF THE RELATED ART

A Wavelength Division Multiplexing (WDM) communication system is a system for generally multiplexing a plurality of optical signals having different wavelength with Arrayed Waveguide Grating (AWG) for transmission. In this case, transmission paths different every the above-described plurality of optical signals are called channels.

In the present WDM communication system, as the demand for transmission capacity grows, it is required that optical signals be transmitted through much more channels than in the conventional WDM communication system. Length of a transmission path through which an optional signal transmits becomes different for each transmission path by the manufacturing error. Thereby, loss of transmission light or an amplification factor of signals which depends on the length of the transmission path, and an influence on the optical signal are also different for each optical signal, and therefore, as a result, quantity of light reaching a light receiving device becomes different for each optical signal having different wavelength. When quantity of the signal light becomes different for each wavelength, it becomes impossible to receive the signal light normally, and therefore, it becomes necessary to adjust the quantity of light individually on a plurality of optical signals different in wavelength for making the signal strength uniform.

Thus, in order to adjust so as to make receiving sensitivity of all optical signals after transmission uniform, for levels of optical signals for each channel, there is used Variable Optical Attenuator (VOA). One of these VOAs is a multi-channel Mach-Zehnder interferometer type optical circuit using the Planar Lightwave Circuit (PLC) technique.

A general Mach-Zehnder interferometer is provided with two Y-shaped branch waveguide paths and two waveguide arms. In the Mach-Zehnder interferometer, two branched ends of a branch waveguide path and one end of two waveguide arms are connected together, and the other end of those two waveguide arms and two branched ends of the other branch waveguide path are connected together. Also, of those two waveguide arms, at least one is provided with a temperature controller. Since a phase of light for transmitting through the waveguide path is changed by controlling the temperature of the waveguide arms by this temperature controller, strength of light obtained by putting together light whose phase has been changed and light whose phase has not been changed is offset each other, and the signal light is attenuated.

Further, the description will be made of a change in phase of the waveguide arm in the Mach-Zehnder interferometer. When an external power source supplies electric power to the temperature controller, the temperature controller generates heat, and temperature of the waveguide arm rises. Then, as the temperature of the waveguide arm rises, a refractive index of the waveguide arm changes, and effective length, which is a value obtained by multiplying an actual waveguide path length by the refractive index, changes. When the effective length changes, the phase of signal light to be transmitted through the waveguide arm changes. Since a phase difference of light which has passed through two waveguide arms and has been put together is changed arbitrarily between 0 and an amount corresponding to a half-wavelength ($\pi$) of light to be propagated, strength of signal light for transmitting through the waveguide arm in the Mach-Zehnder interferometer can be controlled arbitrarily between 0 and a maximum value of a sum of strength of two light.

By adopting the multi-channel Mach-Zehnder interferometer type optical circuit, which is an optical circuit in which each of a plurality of channels for transmitting signal light has been provided with a Mach-Zehnder interferometer as described above, an optical signal inputted is properly attenuated for each channel.

In the Mach-Zehnder interferometer in the Mach-Zehnder interferometer type optical circuit, however, by the heat generated by an adjacent temperature controller, there occurs unintended temperature rise in the waveguide arm. In order for the Mach-Zehnder interferometer to properly attenuate the optical signal, it is required that any influence by heat generated from the temperature controller of such an adjacent Mach-Zehnder interferometer be prevented. Also, it is demanded of the multi-channel Mach-Zehnder interferometer type optical circuit to restrain power consumption required to obtain desired attenuation as low as possible.

FIG. 1 is a plan view for a conventional multi-channel Mach-Zehnder interferometer type optical circuit showing the Mach-Zehnder interferometer having a plurality of Mach-Zehnder interferometers, each of which has the temperature controller 1 in at least one waveguide arm 2. However, the multi-channel Mach-Zehnder interferometer type optical circuit using the PLC technique shown in FIG. 1 has many areas of portions 3 in which there exists no waveguide path. Therefore, there is a problem that there are few Mach-Zehnder interferometers in number to be provided on one chip and the multi-channel Mach-Zehnder interferometer type optical circuit becomes expensive. Further, since this Mach-Zehnder interferometer type optical circuit has great heat interference with the adjacent channel by heat 4 to be generated by the temperature controller 3, there is also a problem that it is difficult to control quantity of light of the signal light to a desired value.

Also, in the conventional multi-channel Mach-Zehnder interferometer type optical circuit shown in FIG. 1, the heat to be generated from the temperature controller 1 causes heat interference (or heat cross talk), that affects the adjacent Mach-Zehnder interferometer, resulting in worsen controllability of the Mach-Zehnder interferometer of each channel or fluctuation in intensity of output light. For example, in a normally-on type optical attenuator, in which loss by the attenuator becomes a minimum at the time of voltage 0 [V], when heat flowing into the waveguide path from the adjacent channel, for example, from the temperature controller of the adjacent channel during a 10 [dB] attenuation operation receives heat interference corresponding to about 5% of quantity of heat to be generated from the temperature controller, the loss fluctuates about ±2 [dB] in the calculation. This value is a very great amount of fluctuation as compared with fluctuation due to polarized light being generally 0.5 [dB] or less. In order to properly control the multi-channel Mach-Zehnder interferometer type optical circuit for each channel, this heat interference must be prevented.

Another reason why the heat interference must be prevented is that power consumption will be increased. When temperature of a waveguide arm having no temperature controller rises by heat interference, in order for the Mach-Zehnder interferometer to perform desired attenuation of signal light, in other words, in order to cause a desired phase difference in the Mach-Zehnder interferometer, the temperature must be further raised.

First means for preventing the heat interference is to widen a distance between adjacent Mach-Zehnder interferometers. The reason is that an amount of interference of heat becomes smaller in inverse proportion to the distance. However, a distance between channels in which heat interference of 5% occurs is about 500 [μm], which is a value equal to or higher than the ordinary distance between arms of the Mach-Zehnder interferometer. Therefore, by the first means, the entire circuit cannot be miniaturized, nor can high-density integration be made.

FIG. 2 shows the Mach-Zehnder interferometer type optical circuit described in Japanese laid-open patent application 2002-169130. In this Mach-Zehnder interferometer type optical circuit, optical attenuator units 5a, 5b, 5c have been arranged shifted in a direction parallel to a propagation direction of the signal light. This arrangement reduces the above-described heat interference with adjacent channels to solve the deteriorated controllability of each channel. However, since this Mach-Zehnder interferometer type optical circuit has also large areas of portions having no pattern of waveguide path, size of elements becomes noticeably large-sized with an increase in number of channels and the Mach-Zehnder interferometer type optical circuit cannot be integrated at high density.

Second means for preventing the heat interference is to arrange material having low thermal conductivity between the adjacent Mach-Zehnder interferometers. For example, in Japanese laid-open patent application heisei 1-158413, a groove 11(a–b) is formed between two Mach-Zehnder interferometers a and b as shown in FIGS. 3a and 3b to merely provide an air layer, whereby the heat interference is prevented without changing the distance with the adjacent channel.

A reason why the heat interference can be prevented by this second means is that since heat is difficult to transfer in an air portion having lower thermal conductivity than the cladding layer, temperature of the waveguide path rises while diffusion of heat is being restrained. By the second means, if the distance between the Mach-Zehnder interferometers is about 500 [μm], the heat interference becomes about 1%, and loss fluctuation during a 10 [dB] attenuation operation will be improved to about ±0.4 [dB], which is of nearly the same degree as fluctuation due to polarized light. However, since fluctuation due to polarized light results from a cause different from that of fluctuation due to heat interference, fluctuation of loss of about ±1 [dB] at maximum obtained by summing up both can occur. Also, when the width of the groove 11(a–b) is narrowed, heat 12 transfers to the adjacent Mach-Zehnder interferometer by radiation as shown in FIG. 4 to cause heat interference, and therefore, it is difficult to independently control the Mach-Zehnder interferometer for each channel.

As described above, conventionally it has been difficult to solve two problems: high-density integration of optical elements and elimination of influence of heat interference simultaneously.

SUMMARY OF THE INVENTION

Thus, in the present invention, in order to solve these two problems, the following means will be used in optical elements including a plurality of Mach-Zehnder interferometer type optical circuits. A first embodiment is characterized in that between the adjacent Mach-Zehnder interferometers, a heat-insulating groove is formed and between the heat-insulating grooves, there is arranged an endothermic wall.

Also, a second embodiment of the present invention is characterized in that in the endothermic wall in the first means, there is included a waveguide path.

Further, a third embodiment of the present invention is characterized in that the Mach-Zehnder interferometers of the Mach-Zehnder interferometer type optical circuit are arranged such that the Mach-Zehnder interferometers are alternately shifted at intervals of one channel in a direction of the optical waveguide and that the interval of one channel is narrowed to be equal to or less than an ordinary interval of the Mach-Zehnder interferometer.

A fourth embodiment of the present invention is characterized in that the Mach-Zehnder interferometer type optical circuit has a plurality of cavities.

In the first embodiment, the heat interference occurring with the adjacent Mach-Zehnder interferometer can be restrained to a very small extent as compared with the fluctuation due to the polarized light. Therefore, even if size of the chip is not changed, the loss fluctuation due to heat interference can be expected to be improved up to a negligible level as compared with the fluctuation due to the polarized light.

Also, in the second embodiment, in addition to the interference in the first embodiment, a number of the channels in the optical circuit can be substantially doubled without substantially changing size of the chip, and a manufacturing cost of the optical circuit per channel can be reduced by half substantially. On the other hand, since the chip becomes smaller by the multi-channel Mach-Zehnder interferometer type optical circuit being integrated at high density, variations in each channel due to differences in structural parameters (such as size of waveguide path and refractive index) can be restrained small as compared with the conventional optical circuit having the same number of channels.

In the third embodiment, when size of the chip has been made to be the same as size of the chip of the prior art, the number of channels exceeds double, and a Mach-Zehnder interferometer type optical circuit further integrated will be realized.

In the fourth embodiment, it can be very easily achieved to restrain heat interference occurring in the Mach-Zehnder interferometer for reducing power consumption.

Through the use of the above-described methods, it is possible to minimize the heat interference while preventing the elements from becoming large-sized for achieving the problems.

BRIEF DESCRIPTION OF THE DRAWINGS

These and other aspects, features and advantages of the present invention will become more fully apparent from the following detailed description taken in conjunction with accompanying drawings. In the drawings.

DETAILED DESCRIPTION OF THE PREFERRED EMBODIMENTS

The description will be made of a preferred example of the Mach-Zehnder interferometer type optical circuit according to the present invention.

Figure 1:
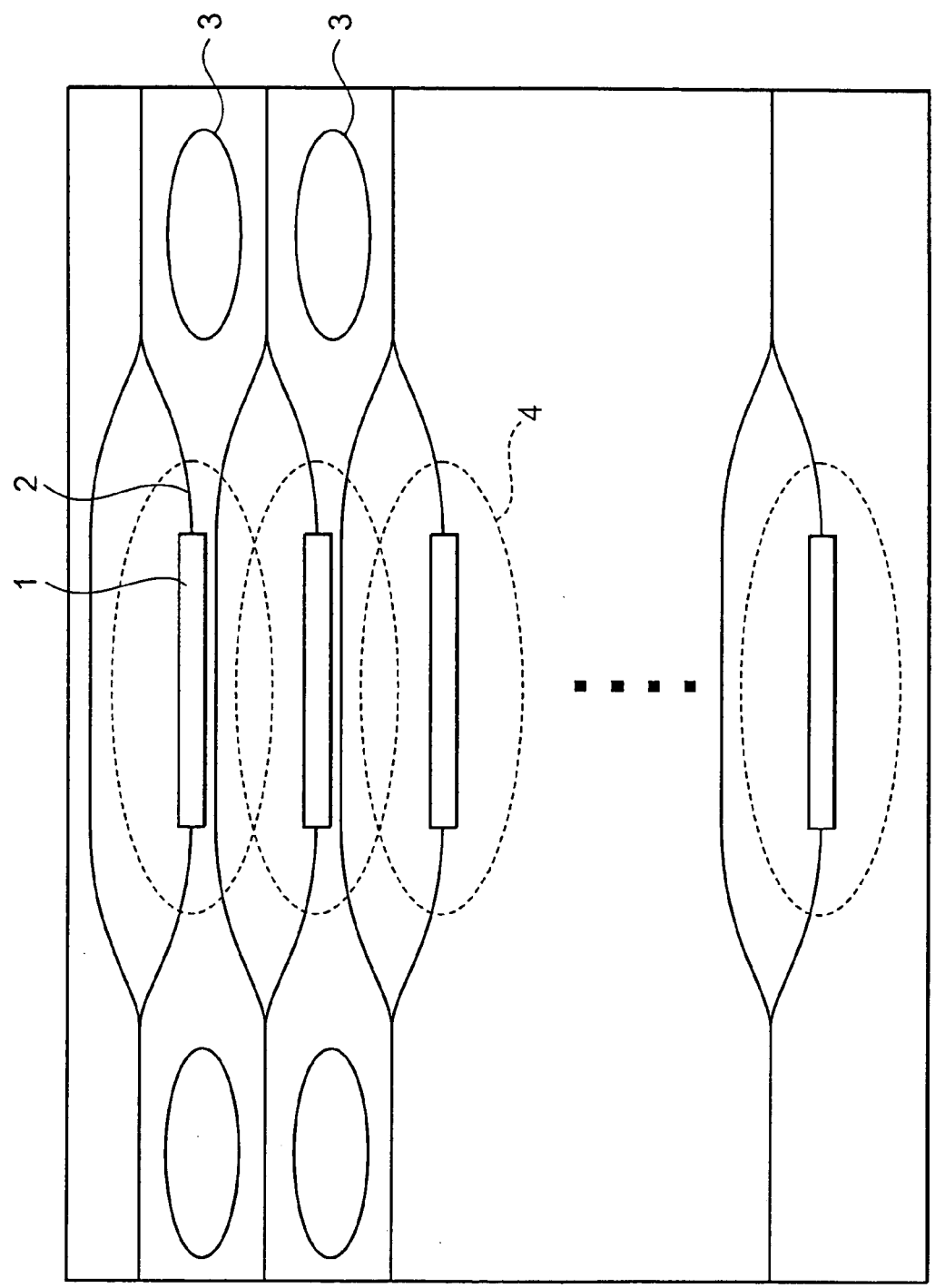
FIG. 1 shows the multi-channel Mach-Zehnder interferometer type optical circuit according to the prior art.
Figure 2:
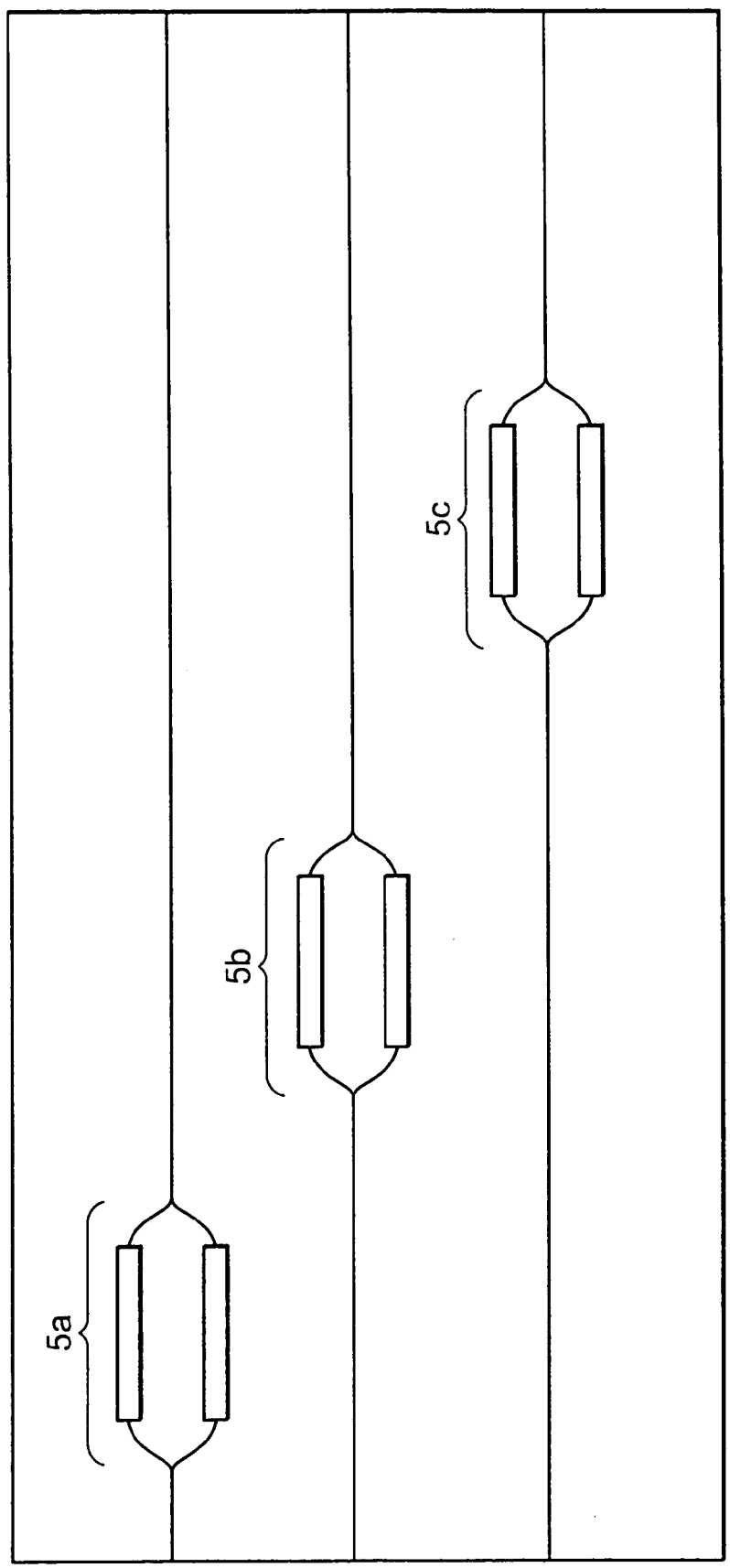
FIG. 2 shows the conventional multi-channel Mach-Zehnder interferometer type optical circuit in which the position of an optical attenuator unit according to the prior art has been shifted in a direction parallel to a propagation direction of a substrate.
Figure 3A:
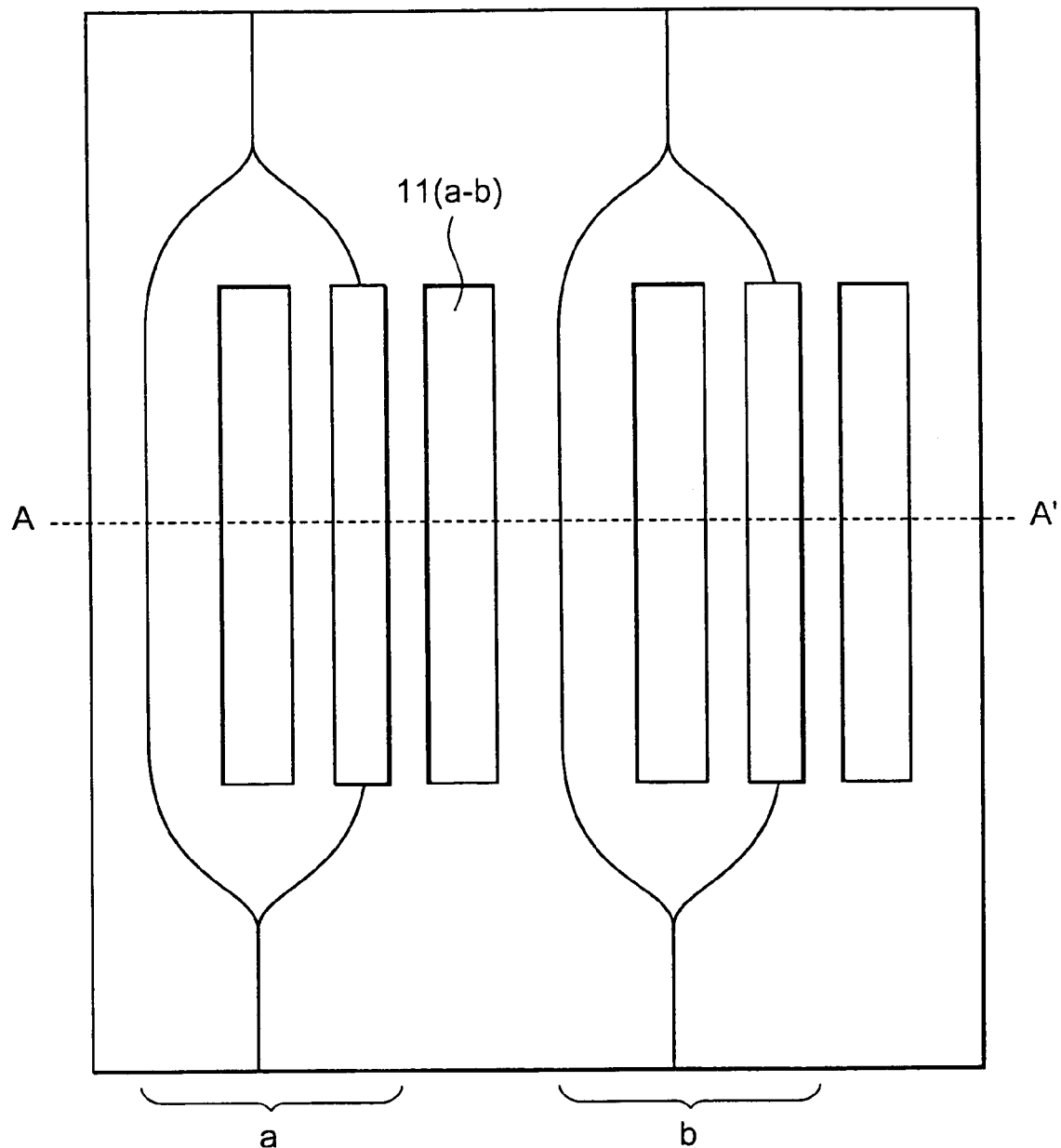
FIG. 3a is a plan view showing the multi-channel Mach-Zehnder interferometer type optical circuit in which a heat-insulating groove according to the prior art has been arranged.
Figure 3B:
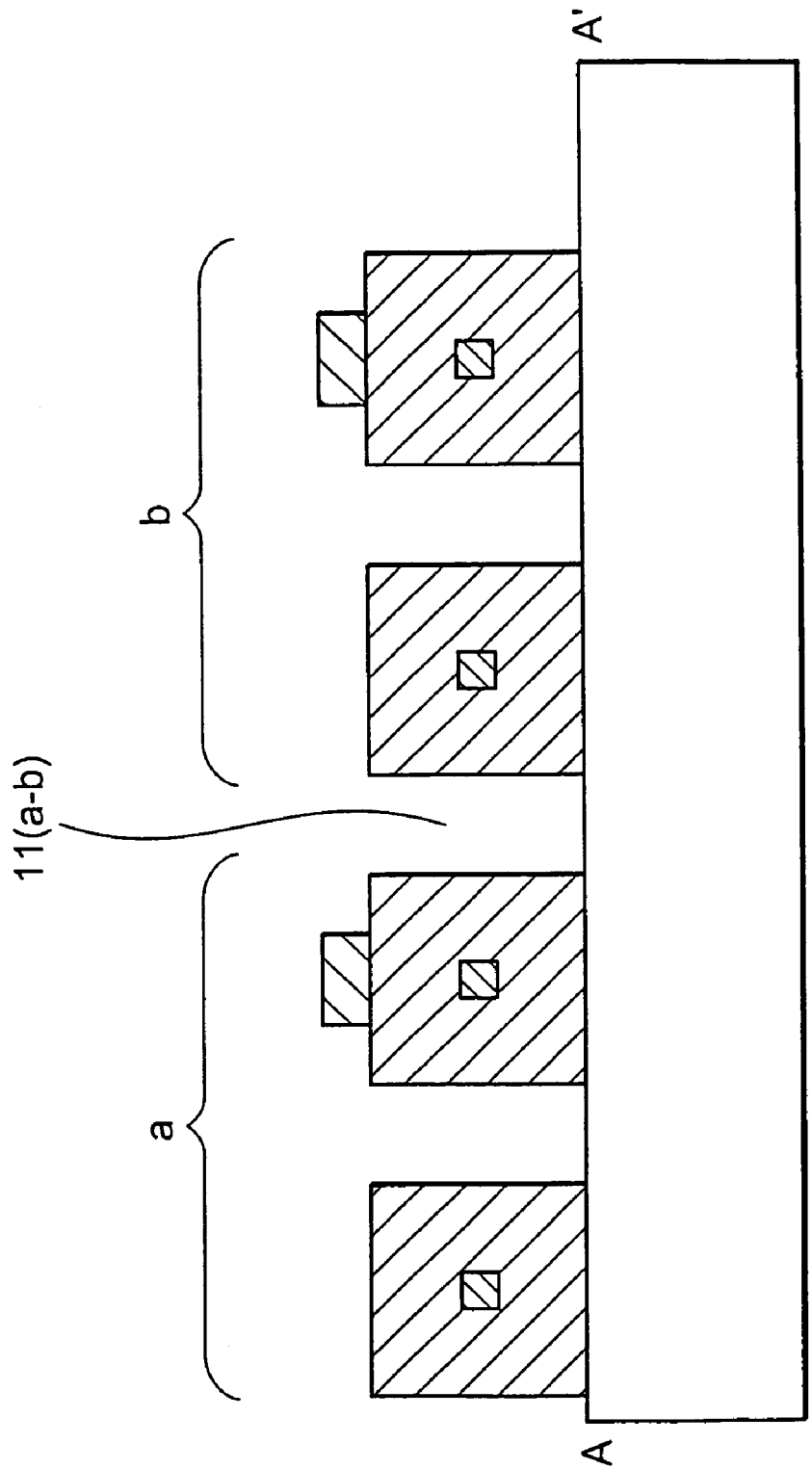
FIG. 3b is a cross-sectional view showing the multi-channel Mach-Zehnder interferometer type optical circuit in which a heat-insulating groove according to the prior art has been arranged.
Figure 4:
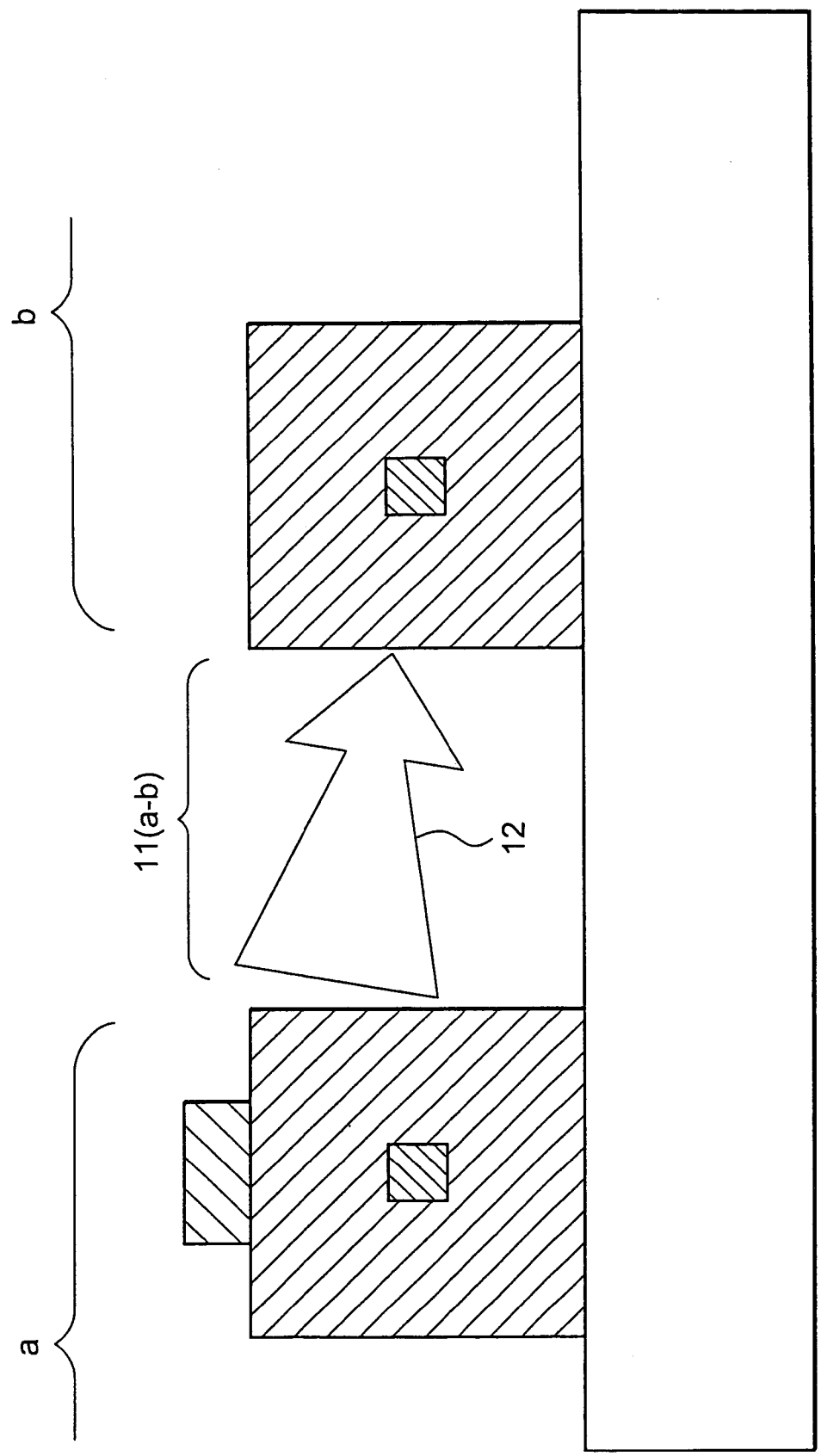
FIG. 4 is a cross-sectional view showing the multi-channel Mach-Zehnder interferometer type optical circuit in which a heat-insulating groove according to the prior art has been arranged.
Figure 5A:
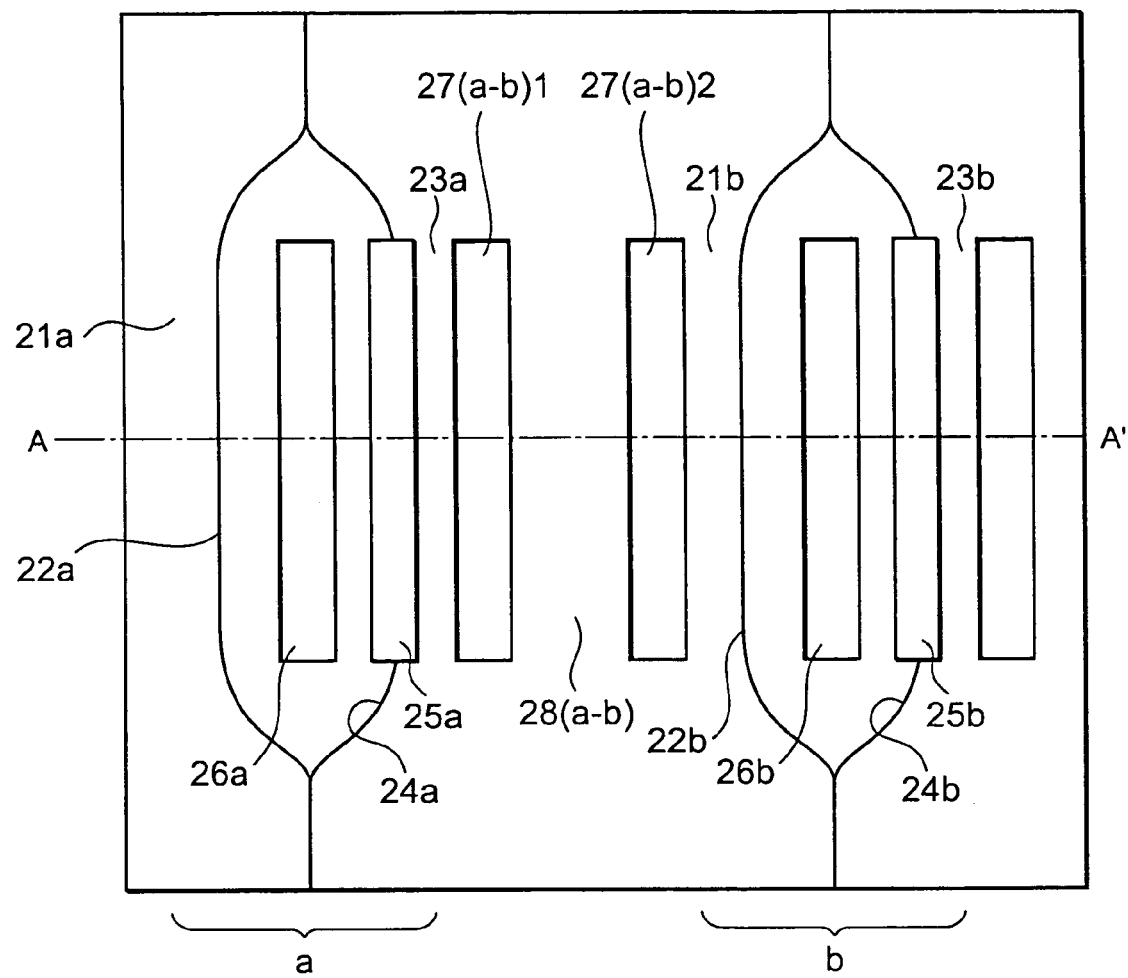
FIG. 5a is a plan view showing the structure of a multi-channel Mach-Zehnder interferometer type optical circuit according to the first embodiment.
Figure 5B:
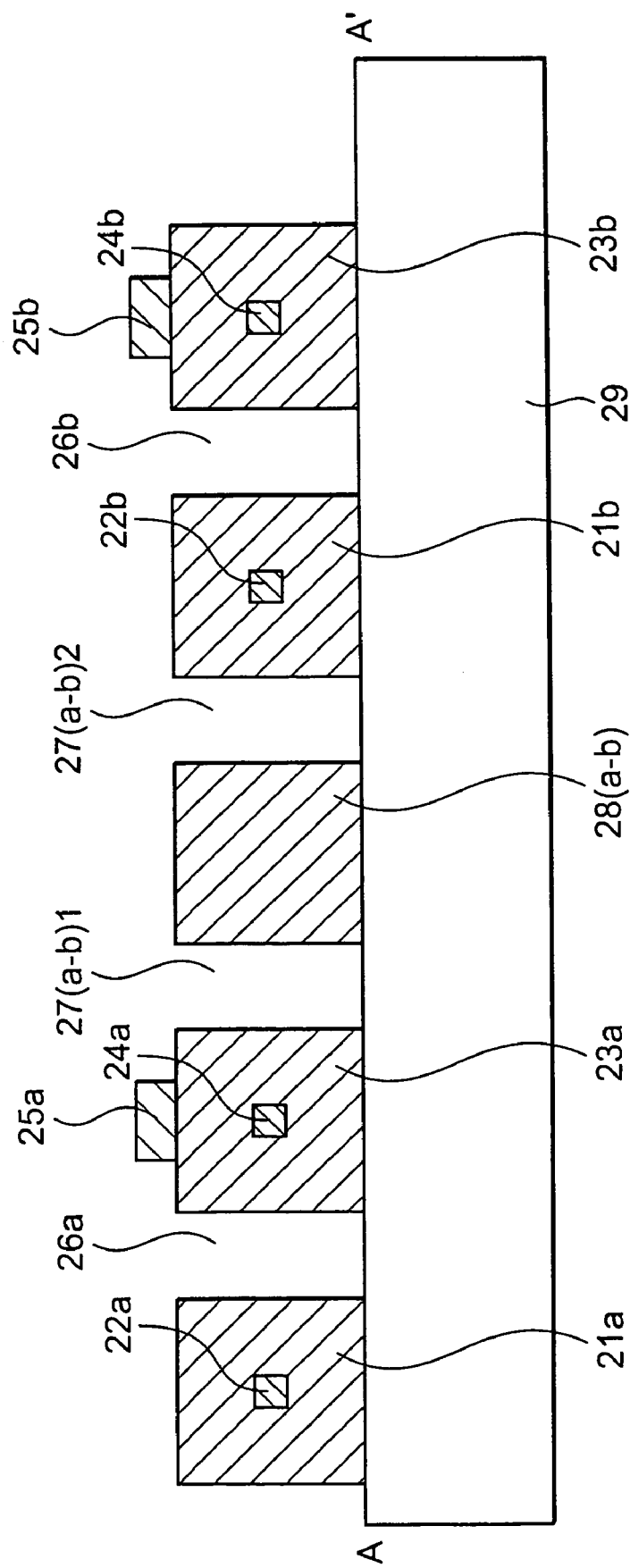
FIG. 5b is a cross-sectional view showing the structure of a multi-channel Mach-Zehnder interferometer type optical circuit according to the first embodiment.

Hereinafter, the description will be made of the Mach-Zehnder interferometer type optical circuit shown in FIGS. 5a and 5b. FIG. 5a is a plan view showing the Mach-Zehnder interferometer type optical circuit according to the present example, showing two Mach-Zehnder interferometers a, b. FIG. 5b is a cross-sectional view taken on line A–A' of FIG. 5a. Reference numeral 21a, 23a designates a cladding layer of a waveguide arm of a Mach-Zehnder interferometer a; 22a, 24a, a core of the waveguide arm of the Mach-Zehnder interferometer a; 25a, a temperature controller; and 26a, a groove between two waveguide arms. Reference numeral 21b, 23b designates a cladding layer of a waveguide arm of a Mach-Zehnder interferometer b; 22b, 24b, a core of the waveguide arm of the Mach-Zehnder interferometer b; 25b, a temperature controller; and 26b, a groove between two waveguide arms. Reference symbol 27(a–b)1, 27(a–b)2 designates a groove between adjacent Mach-Zehnder interferometers: and 28(a–b), an endothermic wall provided between the grooves. In this respect, there can be three or more Mach-Zehnder interferometers, and in this case, two Mach-Zehnder interferometers are shown for the sake of convenience. The waveguide arm is composed of a cladding layer and a core which are represented by 21a and 22a, 23a and 24a, 21b and 22b, and 23b and 24b, and may be either straight-line shaped or curved-line shaped. These waveguide arms of each Mach-Zehnder interferometers have been arranged substantially in parallel respectively. Also, a waveguide path connected to one end of those two waveguide arms in a Y-shape, a waveguide path connected to other end of those two waveguide arms in a Y-shape, and two wave guide arms have also been arranged substantially in parallel. Further, a plurality of Mach-Zehnder interferometers have been arranged in parallel in a direction perpendicular to the longitudinal direction of the waveguide path. Also, the groove 27(a–b)1, 27(a–b)2 and the endothermic wall 28(a–b) are of a long and narrow shape, and is substantially in parallel to the waveguide arm.

Figure 6:
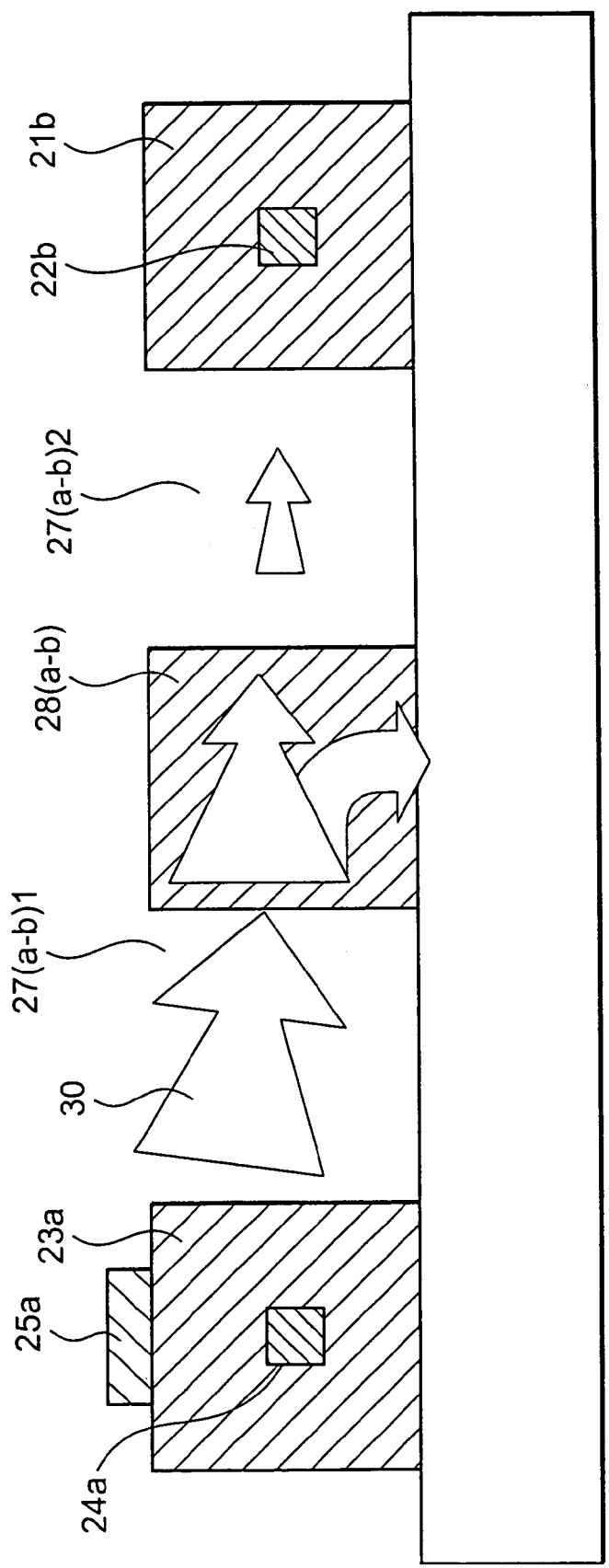
FIG. 6 is a cross-sectional view showing the multi-channel Mach-Zehnder interferometer type optical circuit according to the first embodiment.

FIG. 6 is a view representing a flow of heat in the Mach-Zehnder interferometer type optical circuit according to the present invention. The Mach-Zehnder interferometer type optical circuit according to the present invention is capable of restraining an influence of heat 30 generated from the temperature controller 25a on other Mach-Zehnder interferometers.

Figure 7A:
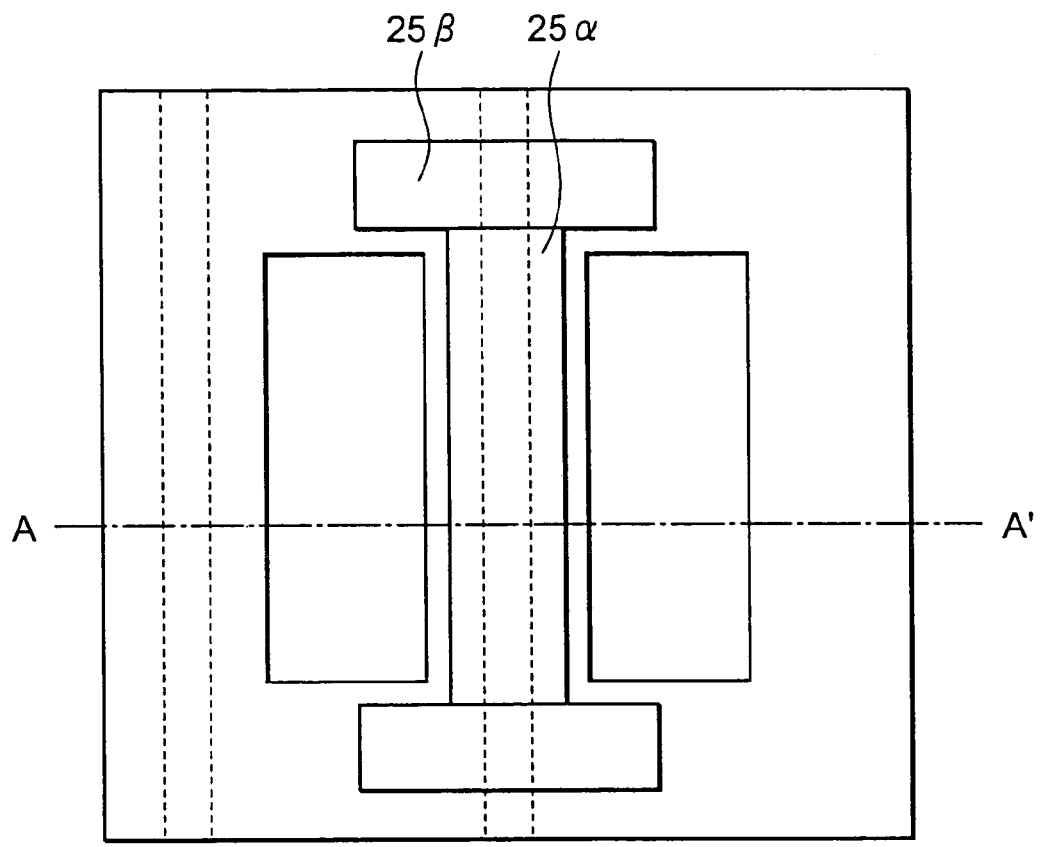
FIG. 7a is a plan view showing arrangement of a temperature controller according to the first embodiment.
Figure 7B:
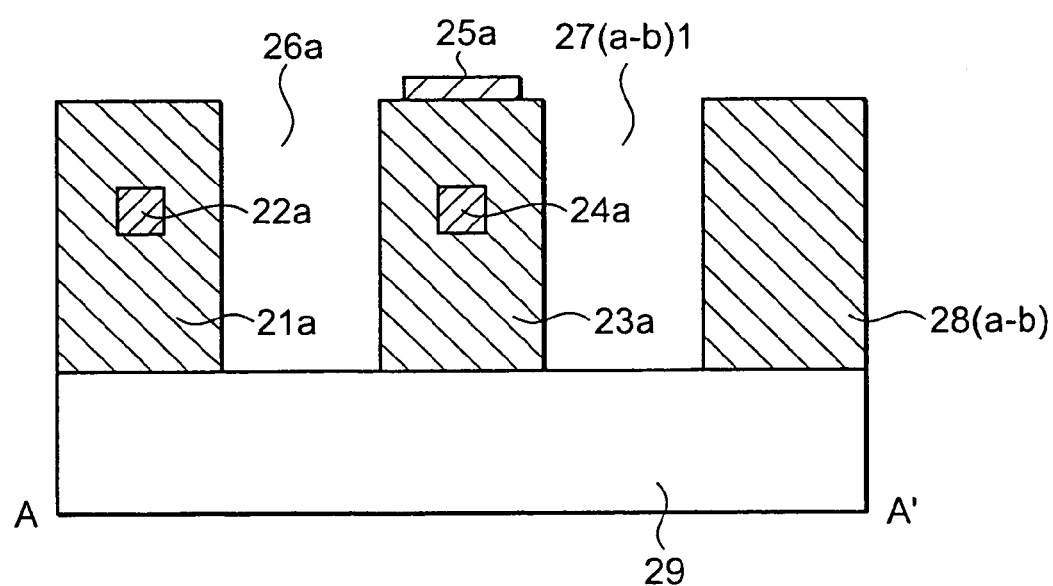
FIG. 7b is a cross-sectional view showing arrangement of a temperature controller according to the first embodiment.

FIG. 7a is a plan view showing that the temperature controller 25a has electrode portions 25α at both ends and a temperature controller 25β between the electrode portions 25α, and FIG. 7b is a cross-sectional view taken on line A–A' of FIG. 7a.

As regards the temperature controller 25a, to give an example of concrete material and size, the temperature controller 25a is made of chrome, and 0.2 [μm] in coating thickness; shape of the electrode portion 25α is square; and the temperature controller portion 25β is shaped like a thin line, having width of 10 [μm] and length of 4 [μm].

Figure 8A:
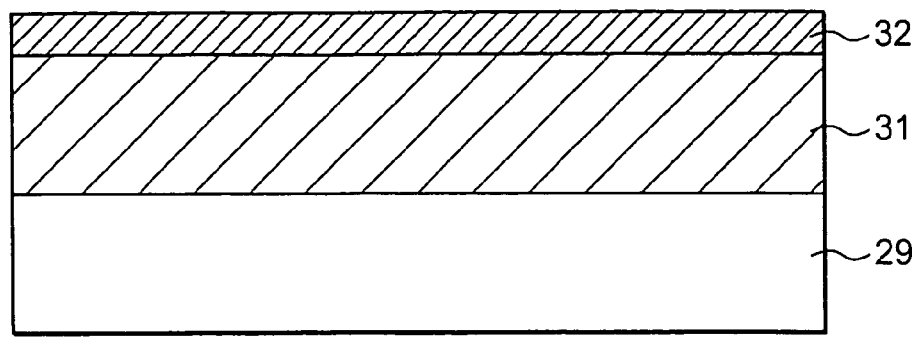
FIGS. 8a to 8e show manufacturing process of the multi-channel Mach-Zehnder interferometer type optical circuit.

FIGS. 8a to 8e are views explaining a manufacturing method for the Mach-Zehnder interferometer type optical circuit according to the present invention. First, FIG. 8a shows that on a substrate 29, a glass film made of BPSG (boron/phosphorus-loaded silica glass) mainly composed of quartz, that is, a lower cladding layer 31 is formed as a film by AP-CVD (normal pressure chemical gas phase film deposition method), and further on the lower cladding layer 31, there is formed a core producing film 32 through the use of material having higher refractive index than the lower cladding layer 31 such as GPSG (germanium/phosphorus-loaded silica glass).

To give an example of size of the substrate 29, the thickness is 0.8 [μm] and the thickness of the glass film is about 14 [μm]. This core producing film 32 is formed as a film to thickness of, for example, 5.5 [μm] by the AP-CVD. At this time, a specific refraction difference Δ between the core producing film 32 and the lower cladding layer 31 becomes 0.65%. The film thickness of the lower cladding layer 31 is considered to be set to about 15 [μm].

Figure 8B:
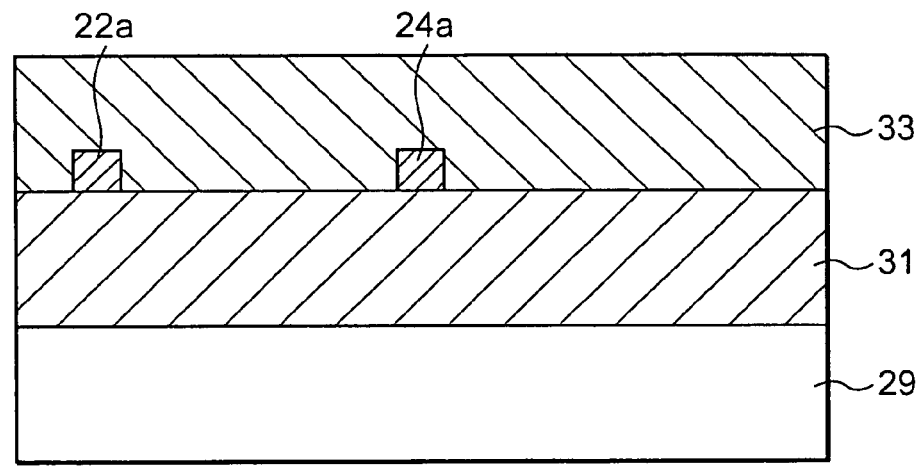

Next, FIG. 8b shows that the core producing film 32 is patterned by photolithography and RIE (reactive ion etching), cores 22a, 24a for extending in the longitudinal direction of a substrate 29 are formed, an upper cladding layer 33 formed by the BPSG or the like so as to embed cores 22a, 24a is formed by AP-CVD, and a embedded type waveguide path is formed.

To give an example of size of the core 22a, 24a and the upper cladding layer 33, the core 22a, 24a has a rectangular cross section, and a shape of the cross section orthogonal to the longitudinal direction of the core is a rectangle having height of 5.5 [μm] and width of 5.5 [μm]. It is conceived that the film thickness of the upper cladding layer 33 is set to about 14 [μm] respectively.

Figure 8C:
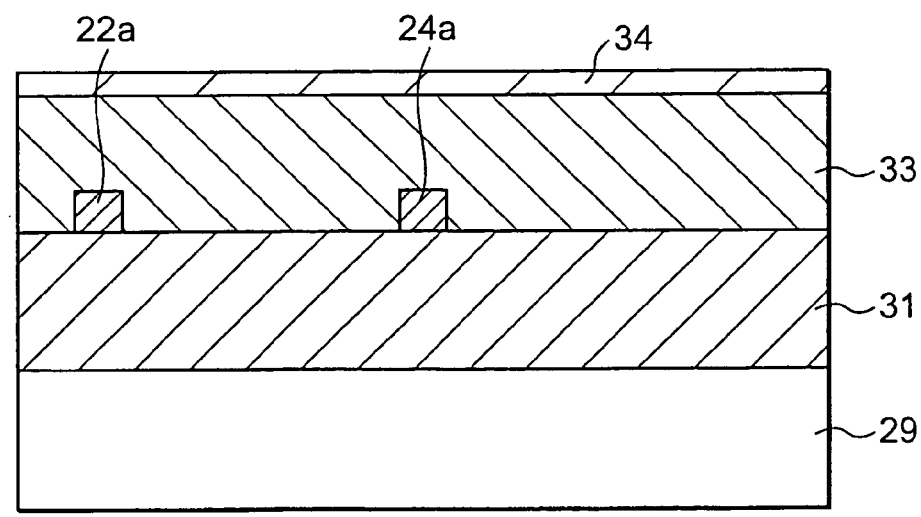

Next, FIG. 8c shows that in a right-above domain of the core 22a, 24a, a metallic film 34 such as a chrome film (not shown) is formed as a film by an electron beam deposition method.

Figure 8D:
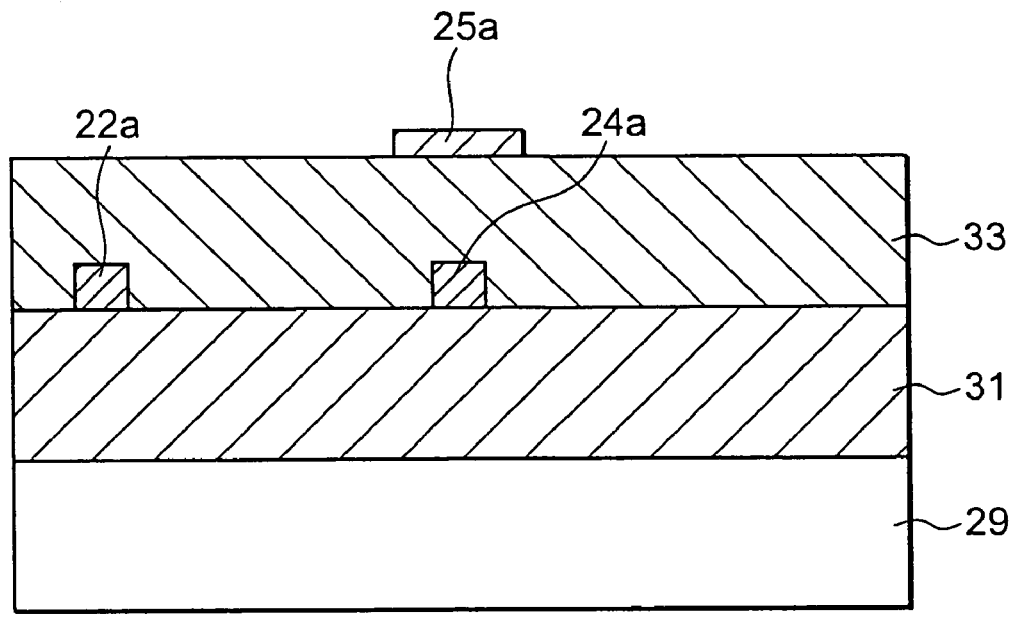

Subsequently, FIG. 8d shows that the metallic film 34 is patterned to a predetermined shape by the photolithography and wet etching to form the temperature controller 25a. As a specific example, the film thickness of the metallic film 34 is 0.2 [μm].

Figure 8E:
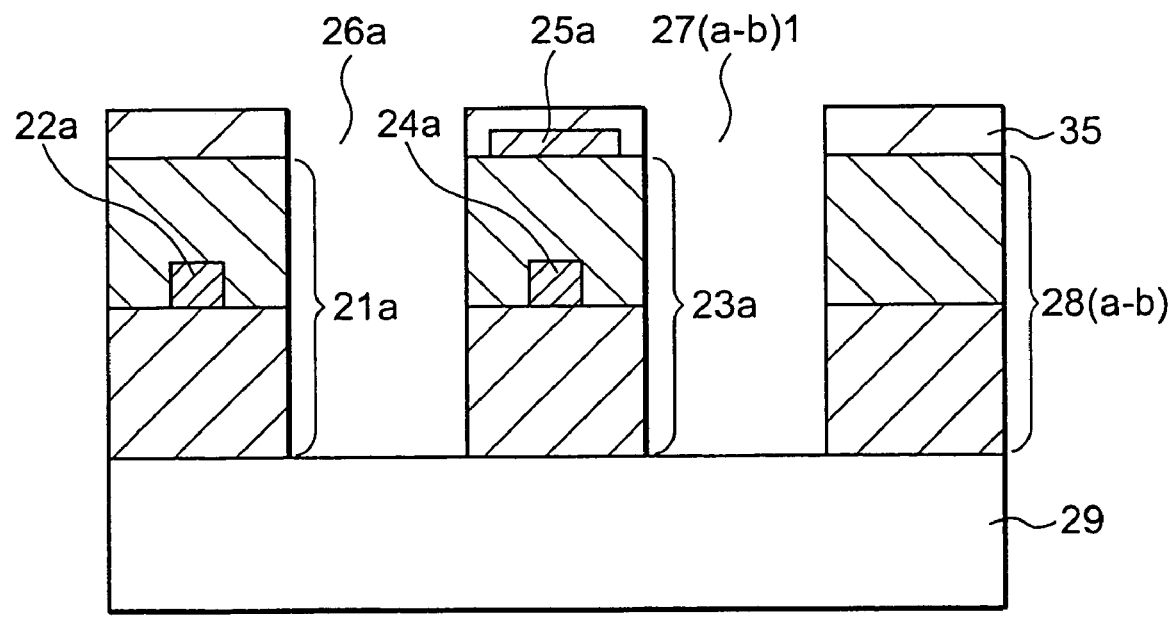

Next, FIG. 8e shows that a resist 35 is formed as a film so as to cover the upper cladding layer 33 and the temperature controller 25a. On the resist 35, an aperture is formed on both sides of the temperature controller 25a by the photolithography. Subsequently, with the resist 35 as a mask, etching is performed by RIE, the aperture is selectively removed, grooves 27(a–b)1 and 27(a–b)2 with depth reaching a substrate 29 are formed, and an endothermic wall 28(a–b) is also formed.

In this case, it is desirable that length of the groove 27(a–b)1, 27(a–b)2 in the longitudinal direction is 4 [μm]; concerning the cladding layer 23a, 21b, the length in a direction orthogonal to the longitudinal direction of the waveguide path is 250 to 600 [μm]; depth of the groove 27(a–b)1, 27(a–b)2 is 29 [μm]: and the width of the endothermic wall 28(a–b) is 25 [μm].

The radiation heat is absorbed to the adjacent channels through the endothermic wall 28(a–b). In a case where a Mach-Zehnder interferometer type optical circuit is constructed through the use of the above-described sizes and material, if there were no endothermic wall 28(a–b), the heat interference on the core 22b would be about 1% of heat to be generated by the temperature controller 25a. In contrast, the heat interference will be able to be reduced up to 0.2% according to the present invention.

The interval between the Mach-Zehnder interferometer a and the Mach-Zehnder interferometer b which are adjacent to each other is usually about 250 to 600 [μm] if the miniaturized circuit and the reduced heat interference are taken into account. The width of the endothermic wall 28(a–b) in this case may be about 25 [μm], which is the same as, for example, the width of the cladding layer 23a remained without being etched, or the like. However, the thicker the endothermic wall 28(a–b) is, the more the endothermic effect is exhibited. Also, if it is shorter than the interval between those two adjacent Mach-Zehnder interferometers, the width of the endothermic wall 28(a–b) will not becomes a barrier to the integration. Therefore, the width of the endothermic wall 28(a–b) may be about 200 [μm], or may be equal to or higher than 200 [μm] so long as it is a value less than the interval between those two adjacent Mach-Zehnder interferometers.

Figure 9A:
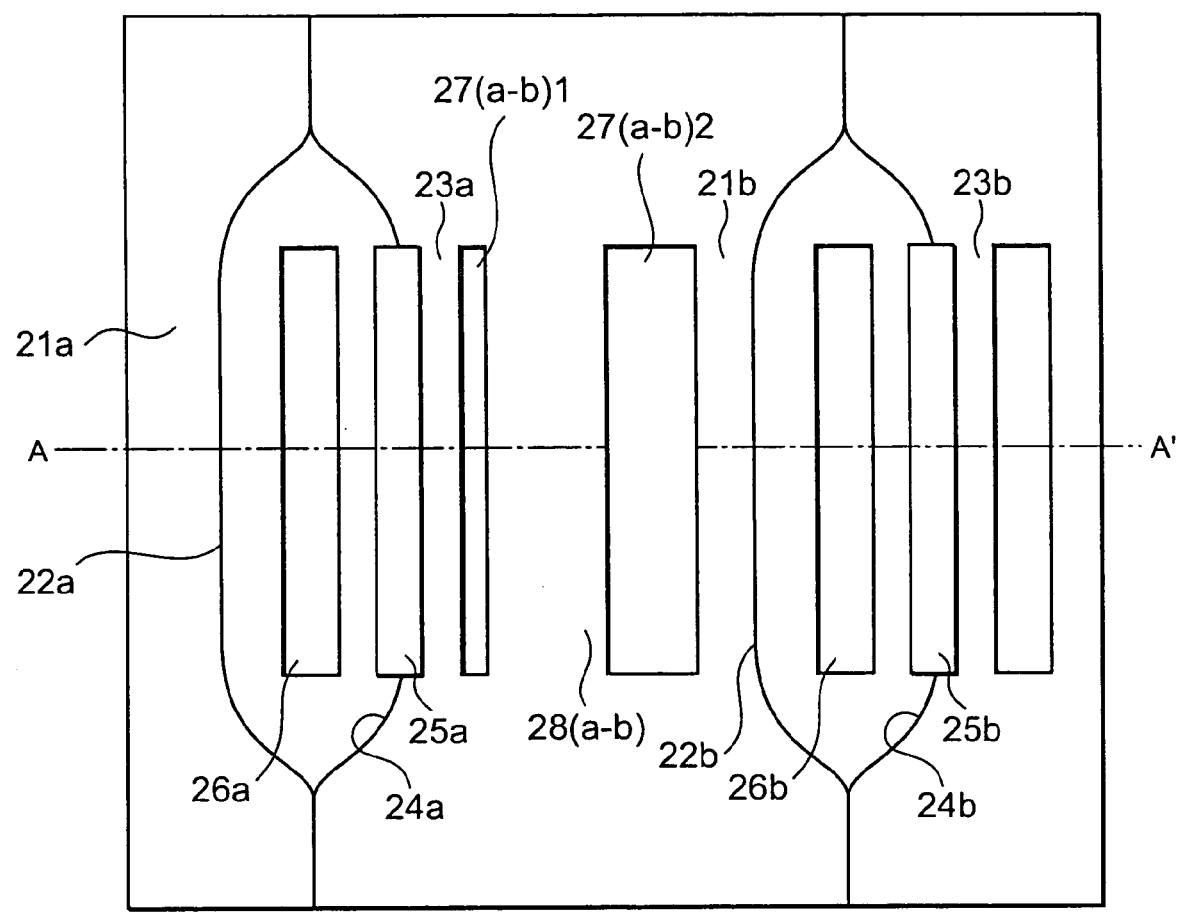
FIG. 9a is a plan view showing the structure of a multi-channel Mach-Zehnder interferometer type optical circuit in which an endothermic wall has been provided near the temperature controller.
Figure 9B:
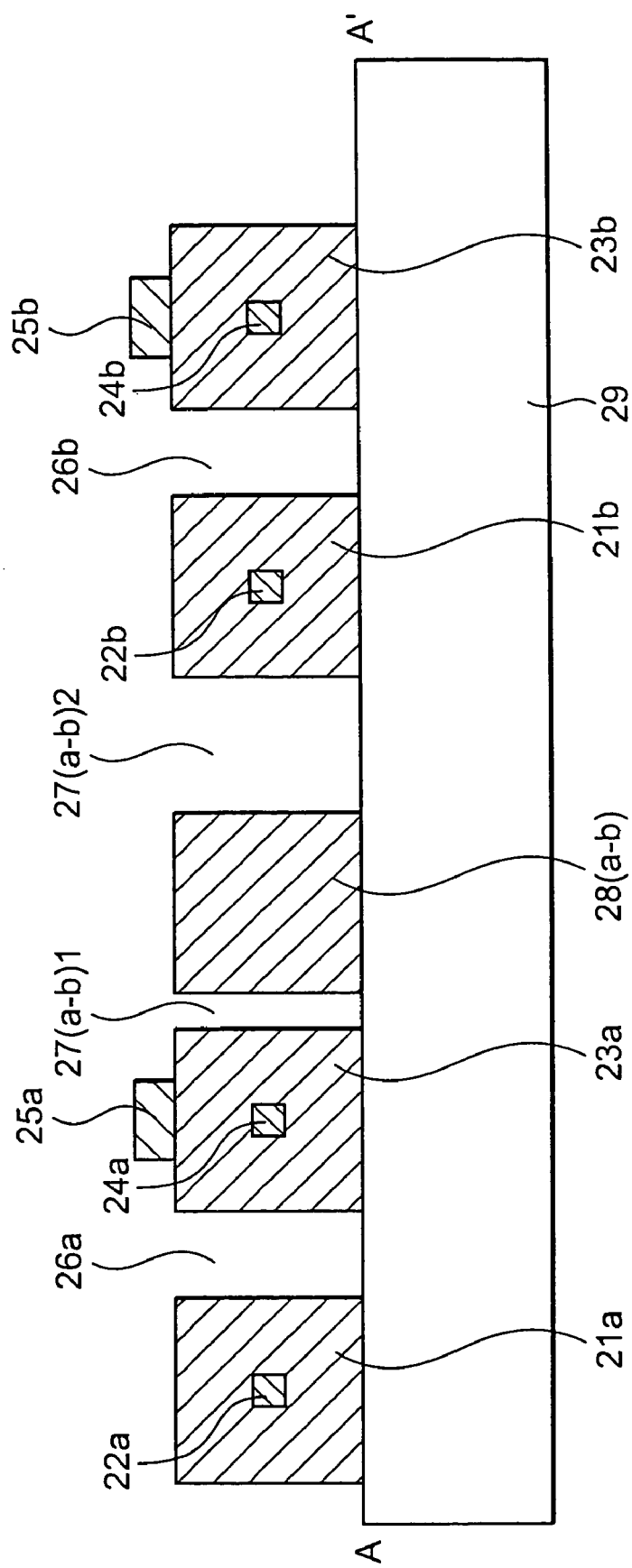
FIG. 9b is a cross-sectional view showing the structure of a multi-channel Mach-Zehnder interferometer type optical circuit in which an endothermic wall has been provided near the temperature controller.

FIG. 9a is a plan view showing that an endothermic wall 28(a–b) has been provided near the temperature controller 25a, and FIG. 9b is a cross-sectional view taken on line A–A' of FIG. 9a. The endothermic wall 28(a–b) may be provided at any portion between the Mach-Zehnder interferometer a and the Mach-Zehnder interferometer b, and in order to enhance the endothermic effect, it is desirable to locate close to the heat source. Therefore, the heat interference can be effectively restrained by providing the endothermic wall 28(a–b) near the temperature controller 25.

When the width between two waveguide arms in the Mach-Zehnder interferometer a according to the present invention is 200 [μm] or higher, there is no significant change in power consumption of the temperature controller 25a, but when the width between two waveguide arms is 50 [μm], it becomes necessary to increase the power consumption by about 10% under the influence of the heat interference. Therefore, by taking into account the influence of the power consumption and the size of the circuit, the width of the groove 26a is desirably set to 60 [μm].

In this respect, in order to integrate the circuit, it is desirable that the respective waveguide paths be substantially parallel, and it is capable of enhancing integration density of the Mach-Zehnder interferometer type optical circuit to regularly arrange the Mach-Zehnder interferometers.

Figure 10:
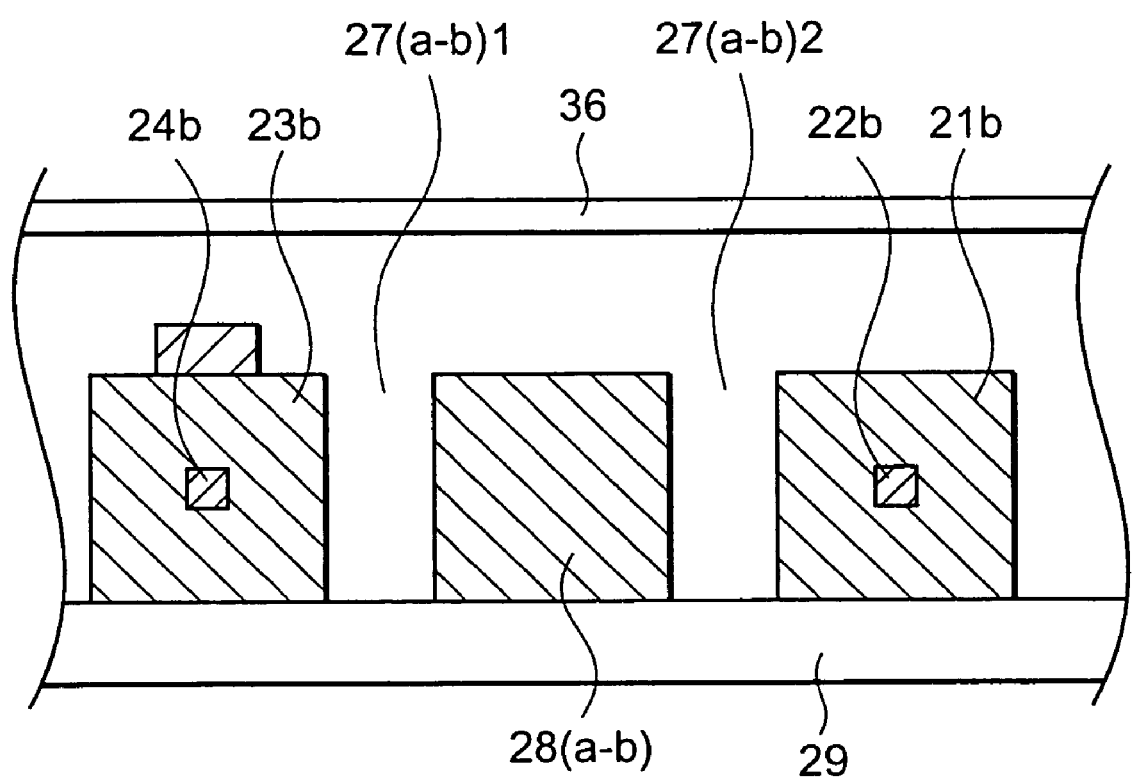
FIG. 10 shows the structure of the multi-channel Mach-Zehnder interferometer type optical circuit hermetically sealed.

FIG. 10 shows that sealing has been performed by covering the surface of the Mach-Zehnder interferometer type optical circuit with the cover in addition to the above-described example. By covering the surface of the Mach-Zehnder interferometer type optical circuit with the cover 36, sealing is performed and pressure within space defined by grooves 27(a–b)1 and 27(a–b)2 is reduced among others, whereby thermal conductivity in the space defined by the grooves 27(a–b)1 and 27(a–b)2 is made lower than the air at normal pressures to thereby make it possible to further reduce the heat interference. Also, even if the space within the groove may be filled with gas having low thermal conductivity such as rare gas, it is possible to make the thermal conductivity lower than when filled with air, and to reduce the heat interference.

Figure 11:
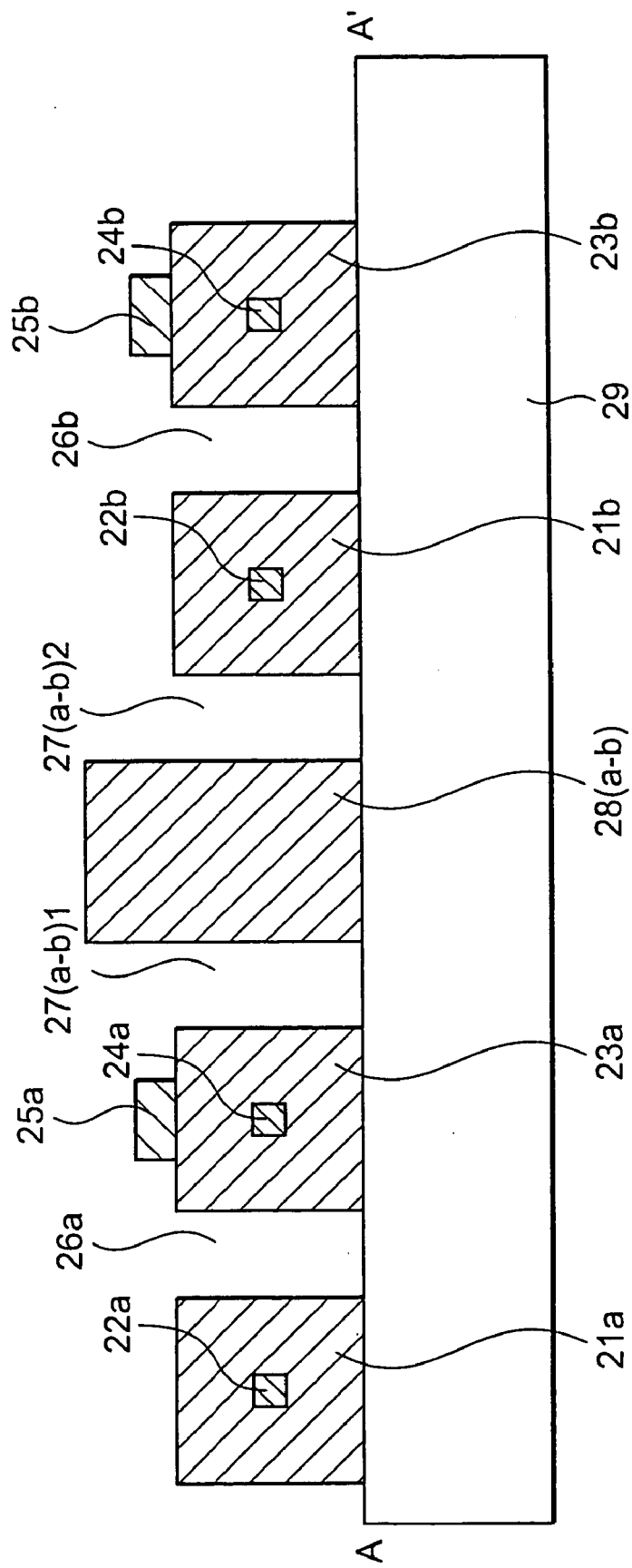
FIG. 11 shows the structure of the multi-channel Mach-Zehnder interferometer type optical circuit in which the endothermic wall has been provided higher than a waveguide path.

FIG. 11 shows that height of the endothermic wall 28(a–b) has been made higher than the cladding layers 23a and 21b. As described above, the height of the endothermic wall 28(a–b) has been made higher than the cladding layers 23a and 21b, whereby the endothermic wall 28(a–b) is capable of increasing the endotherm, and further restraining the heat interference.

Figure 12A:
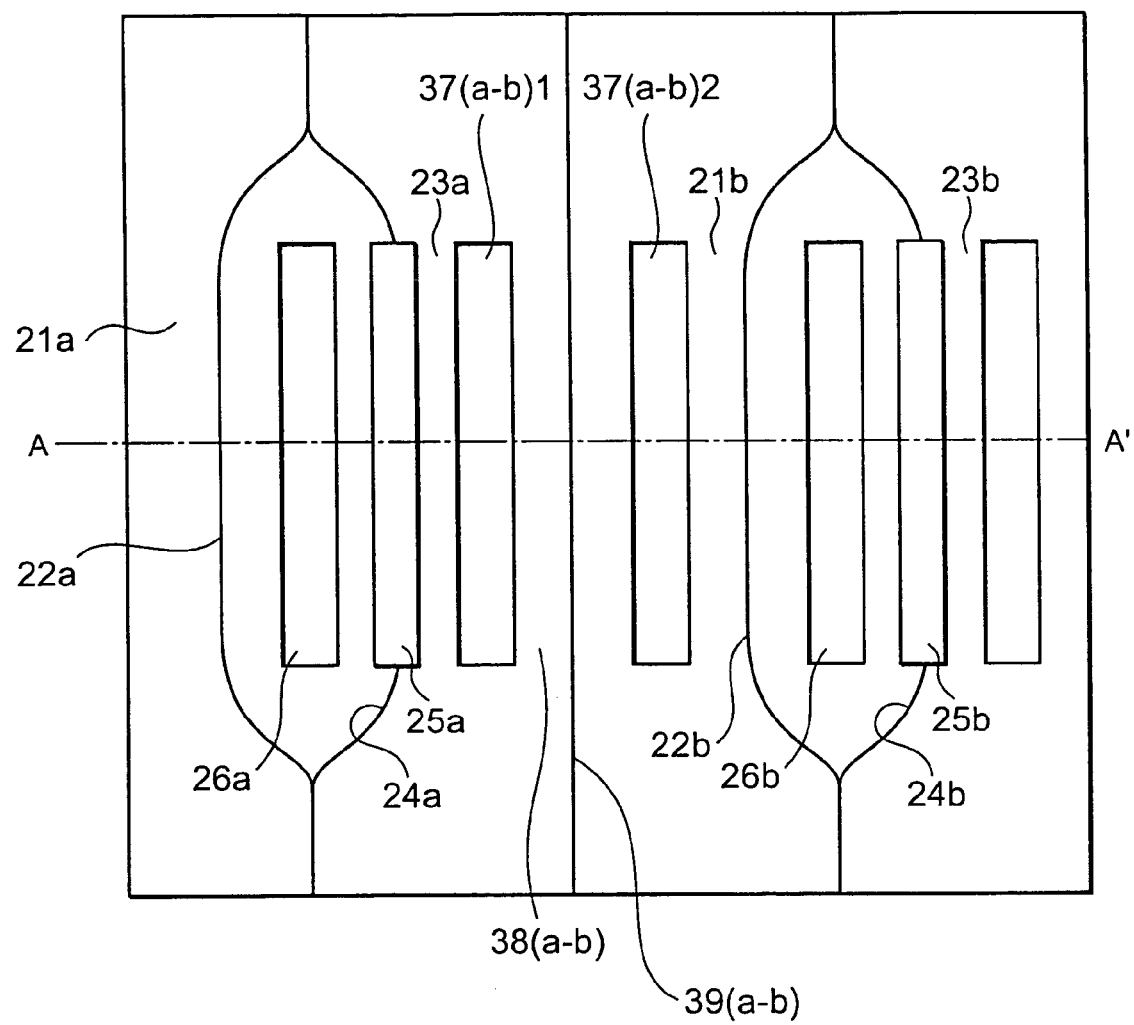
FIG. 12a is a plan view showing the structure of a multi-channel Mach-Zehnder interferometer type optical circuit according to a second embodiment.
Figure 12B:
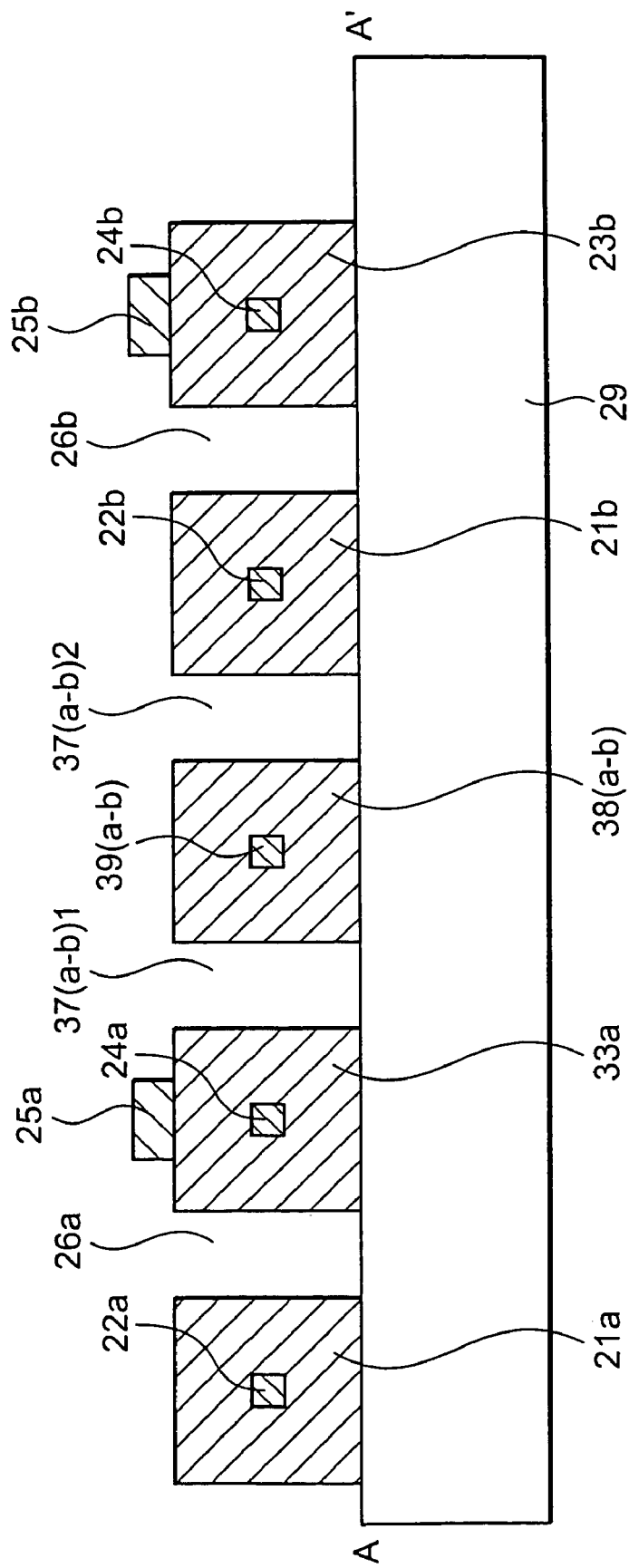
FIG. 12b is a cross-sectional view showing the structure of a multi-channel Mach-Zehnder interferometer type optical circuit according to the second embodiment.

FIG. 12a is a plan view showing the Mach-Zehnder interferometer type optical circuit according to a second embodiment of the present invention, in which there has been provided a waveguide path within the endothermic wall, and FIG. 12b is a cross-sectional view taken on line A–A' of FIG. 12a. In the present embodiment, within an endothermic wall 38(a–b) consisting of the cladding layer, there is provided a core 39(a–b), whereby there is formed a waveguide path, and a Mach-Zehnder interferometer type optical circuit can be integrated more effectively than the first embodiment.

When light transmits through the core 39(a–b) provided within the endothermic wall 38(a–b) having width of, for example, 25 [μm], the light slightly fluctuates the phase because of radiation heat from the adjacent temperature controller 25a. However, since the fluctuation does not occur in the waveguide arm, a phase difference between two light transmitted through two waveguide arms will not be affected. Therefore, no problem is posed in the loss due to attenuation, dependence of polarized wave and the like. As regards a method for providing the core 39(a–b) in the present embodiment, when drawing a pattern of the core with a photomask for waveguide path formation during the manufacture of the Mach-Zehnder interferometer type optical circuit, the core pattern is also drawn on the endothermic wall, whereby the waveguide path is prepared on the endothermic wall. For the other manufacturing method, the quite same method as the first embodiment can be used.

Since the Mach-Zehnder interferometer type optical circuit according to the present embodiment uses the endothermic wall as the waveguide path, the domain limited in the design of the optical circuit can be utilized effectively, and the optical circuit can be high-integrated.

In this respect, as regards an amount of heat interference in the present embodiment, the above-described first embodiment is applicable, and when constructed of specific sizes and material described in the first embodiment, the amount of heat interference which the adjacent Mach-Zehnder interferometer receives becomes 0.2% of heat to be generated by the temperature controller 25a, and can realize an exceedingly low value.

Also, as in the case of the first embodiment, the width of the endothermic wall 38(a–b) may be about 200 [μm], or may be equal to or higher than 200 [μm] so long as it is a value less than the interval between those two adjacent Mach-Zehnder interferometers.

Figure 13:
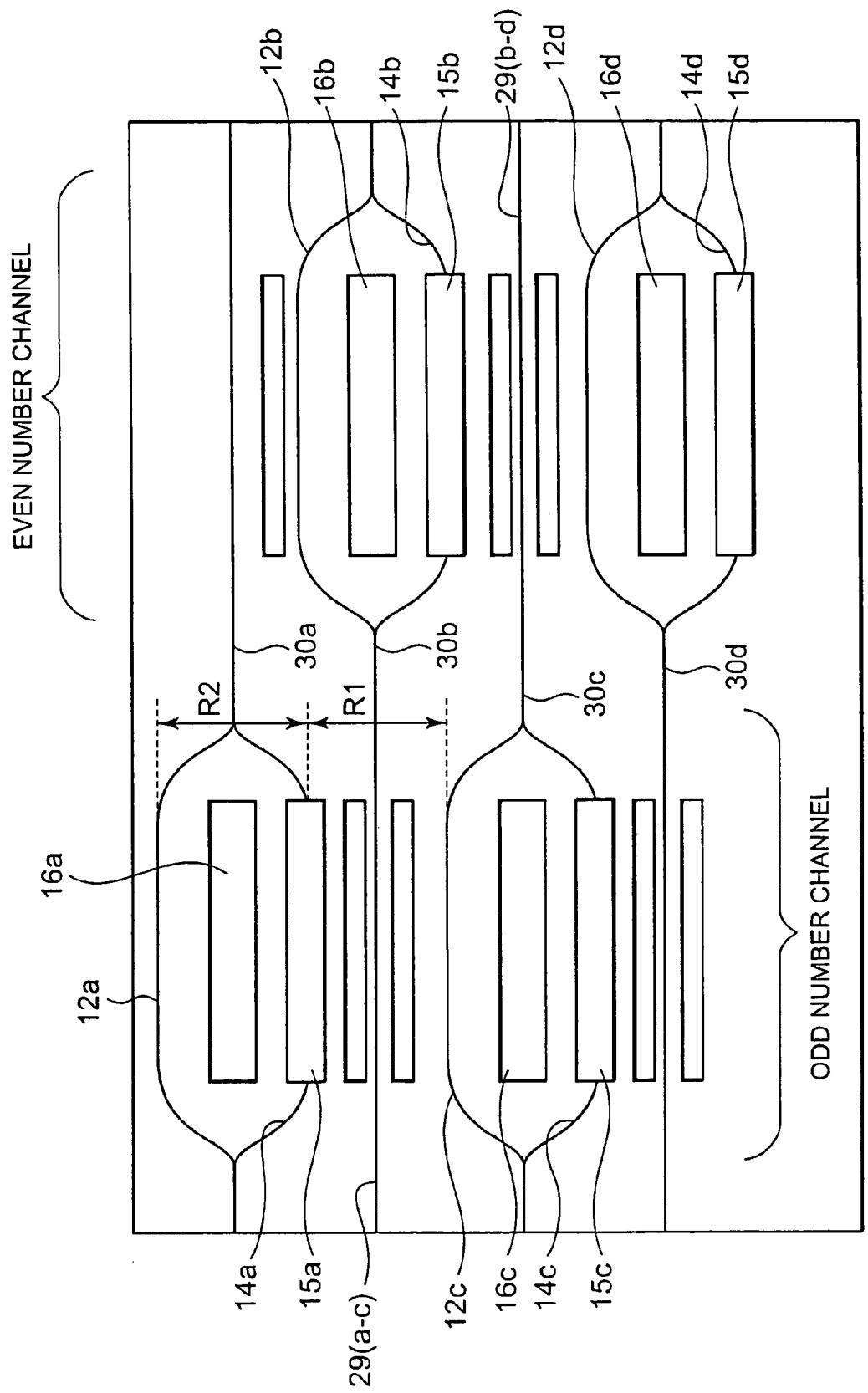
FIG. 13 shows the structure of a multi-channel Mach-Zehnder interferometer type optical circuit according to a third embodiment.

FIG. 13 is a view showing the Mach-Zehnder interferometer type optical circuit according to the third embodiment in which the Mach-Zehnder interferometers are alternately arranged in a direction of the optical waveguide and arranged such that the interval between the Mach-Zehnder interferometers in a direction perpendicular to the longitudinal direction of the waveguide path is narrowed. The Mach-Zehnder interferometer type optical circuit according to the present embodiment is arranged such that the Mach-Zehnder interferometers are alternately shifted at intervals of one channel in the longitudinal direction of the optical waveguide path and that the Mach-Zehnder interferometers arranged at intervals of one channel are narrowed as compared with an ordinary interval of the Mach-Zehnder interferometer, whereby the circuit is integrated and the heat interference between the Mach-Zehnder interferometers is also restrained.

As regards the Mach-Zehnder interferometers arranged alternately shifted in the longitudinal direction, the Mach-Zehnder interferometers arranged in parallel in a direction substantially perpendicular to the longitudinal direction of the waveguide path are divided into two groups by their shifted arrangement, and one is called an odd number channel while the other is called an even number channel. For example, the Mach-Zehnder interferometers a, c in FIG. 13 are odd number channels, and the Mach-Zehnder interferometers b, d are even number channels. When the Mach-Zehnder interferometer of an odd number channel located exceedingly near the Mach-Zehnder interferometer of another odd number channel is considered to be a virtual adjacent channel relating to the heat interference, heat generated from the temperature controller 25a is absorbed by the endothermic wall 28(a–c) of an even number channel arranged between the Mach-Zehnder interferometers of an odd number channel. Conversely, When the Mach-Zehnder interferometer of an even number channel located exceedingly near the Mach-Zehnder interferometer of another even number channel is considered to be a virtual adjacent channel relating to the heat interference, heat generated from the temperature controller 25c is absorbed by the endothermic wall 38(b–d) of an odd number channel arranged between the Mach-Zehnder interferometers of an even number channel.

In FIG. 13, a distance between a core 15a and a core 12c of a virtual adjacent channel in the odd number or even number channel is assumed to be R1, and a distance between a core 12a and 15a in the same Mach-Zelinder interferometer is assumed to be R2. Each of the same Mach-Zehnder interferometer is arranged such that a relation of R1<R2 is satisfied, whereby the entire chip can be further miniaturized. Also, R1 can be also made into 250 to 600, the same extent as the distance between the adjacent Mach-Zehnder interferometers. According to the present example, the integration density becomes double or more the prior art, and the heat interference can be sufficiently prevented.

Figure 14:
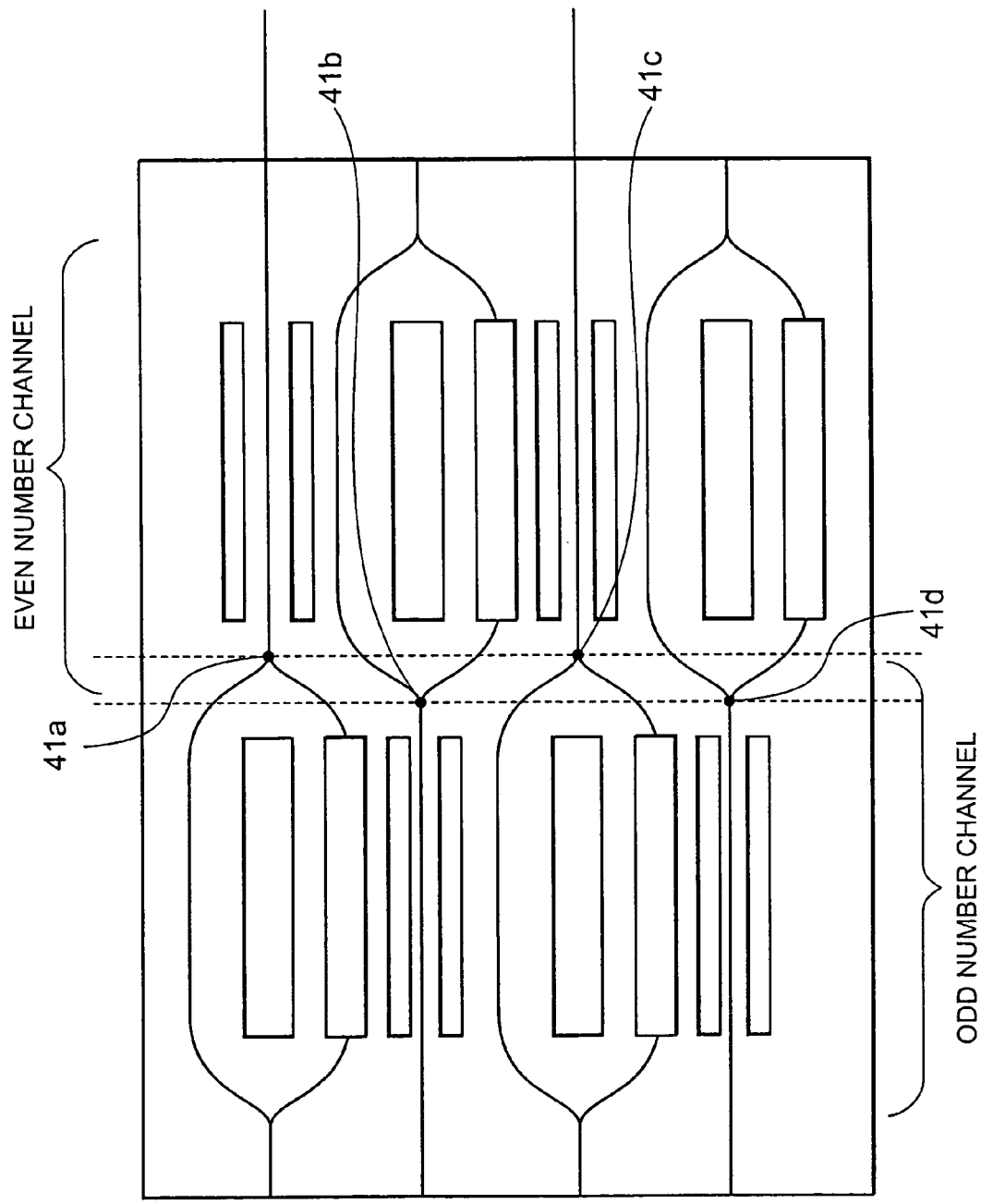
FIG. 14 shows the structure of a multi-channel Mach-Zehnder interferometer type optical circuit according to the third embodiment.

FIG. 14 is a view showing an embodiment according to the third embodiment in which the Mach-Zehnder interferometer type optical circuit has been further miniaturized. In order to further miniaturize the apparatus, it is desirable to narrow the distance between the Mach-Zehnder interferometers for each channel even in the longitudinal direction of the optical waveguide. For this reason, as shown in FIG. 14, a branch point 41a, 41c of the waveguide arm of the Mach-Zehnder interferometer of an odd number channel is arranged nearer between the Mach-Zehnder interferometers of an even number channel than a branch point 41b, 41d of an even number channel. In this respect, in the present embodiment, each Mach-Zehnder interferometer of an odd number channel is arranged in a direction substantially perpendicular to the longitudinal direction of the waveguide path. Also, even each Mach-Zehnder interferometer of an even number channel is likewise preferably arranged in a direction substantially perpendicular to the longitudinal direction of the waveguide path.

The Mach-Zehnder interferometer according to the present embodiment is effective in which the circuit can be also miniaturized while restraining the heat interference. In this respect, those skilled in the art can easily understand that in addition to an example in which the Mach-Zehnder interferometers are divided into an even number channel and an odd number channel and are arranged shifted at intervals of one channel, it is also included in the thought of the related invention that the Mach-Zehnder interferometers according to the present embodiment can be arranged regularly such as at intervals of two channels or at intervals of three channels shifted in the longitudinal direction of the waveguide path.

Figure 15A:
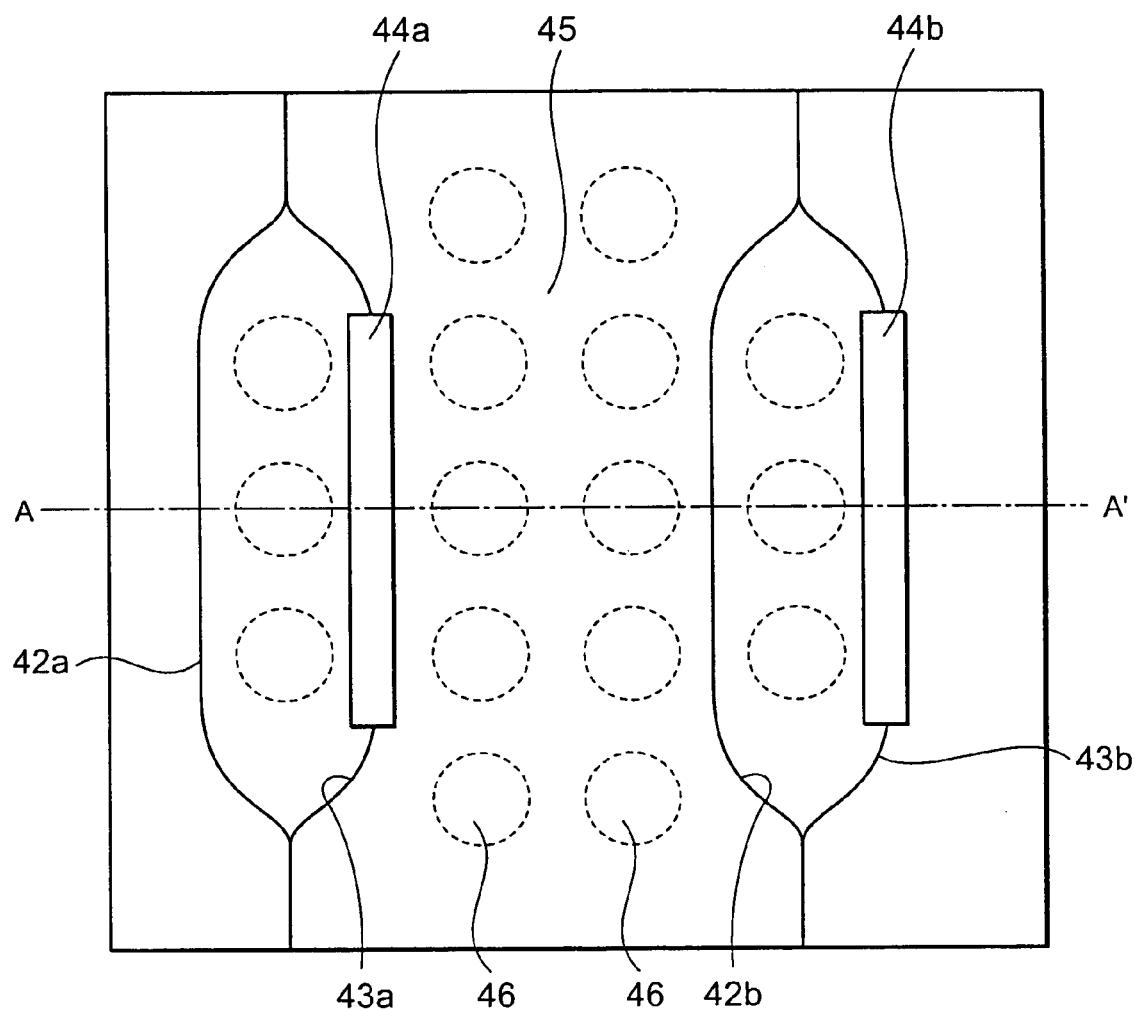
FIG. 15a is a plan view showing the structure of a multi-channel Mach-Zehnder interferometer type optical circuit according to the fourth embodiment.
Figure 15B:
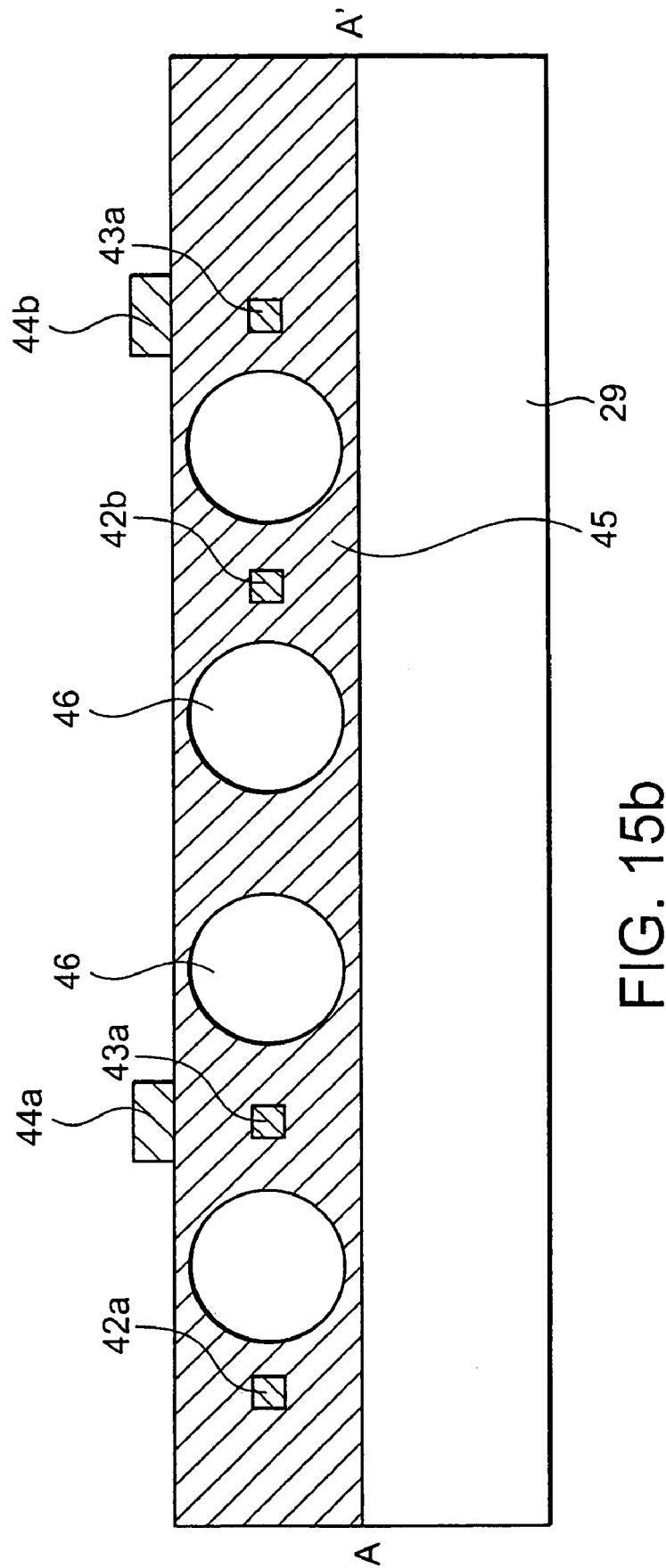
FIG. 15b is a cross-sectional view showing the structure of a multi-channel Mach-Zehnder interferometer type optical circuit according to the fourth embodiment.

FIG. 15a shows the Mach-Zehnder interferometer type optical circuit according to the fourth embodiment in which the cladding layer has been provided with a plurality of cavities, and FIG. 15b is a cross-sectional view taken on line A–A' of FIG. 15a. In the present embodiment, the cladding layer is formed with a plurality of cavities 46, and the cladding layer 45 absorbs heat, whereby the heat interference is restrained to reduce the power consumption. Also, as regards the manufacturing method, it is manufactured by adding a process for forming the cavities 46 after the Mach-Zehnder interferometer type optical circuit having no groove between the adjacent Mach-Zehnder interferometers is formed. Also, even if the cavities have not always uniform size, the heat interference can be restrained. Therefore, according to the present method, the heat interference is restrained by a very simple method and the power consumption is reduced. Also, it is desirable to form two or more space between the adjacent Mach-Zehnder interferometers on the cross section of the surface A–A'.

Obviously, numerous additional modifications and variations of the present invention are possible in light of the above teachings. It is, therefore, to be understood that within the scope of the appended claims, the invention may be practiced otherwise than as specifically described herein.

What is claimed is:

1. A Mach-Zehnder interferometer type optical circuit, comprising:
   a first Mach-Zehnder interferometer and a second Mach-Zehnder interferometer provided on a substrate, each of which comprising two waveguide arms and a temperature control circuit for adjusting temperature of one of said two waveguide arms; and
   an endothermic wall provided between said first Mach-Zehnder interferometer and said second Mach-Zehnder interferometer so to reduce heat interference between said first and second Mach-Zehnder interferometers.

2. The Mach-Zehnder interferometer type optical circuit as claimed in claim 1, wherein said waveguide arms of said first Mach-Zehnder interferometer and said second Mach-Zehnder interferometer are arranged substantially in parallel to each other in a longitudinal direction, and said endothermic wall extends substantially in parallel to said longitudinal direction.

3. The Mach-Zehnder interferometer type optical circuit as claimed in claim 1, further comprising a waveguide path provided in said endothermic wall.

4. The Mach-Zehnder interferometer type optical circuit as claimed in claim 3, further comprising a third Mach-Zehnder interferometer which is different from said first Mach-Zehnder interferometer and said second Mach-Zehnder interferometer;
   wherein said waveguide path provided in said endothermic wall is a waveguide path of said third Mach-Zehnder interferometer.

5. The Mach-Zehnder interferometer type optical circuit as claimed in claim 1, further comprising a cover for covering said Mach-Zehnder interferometer type optical circuit, wherein in a portion covered with said cover exists gas having a lower thermal conductivity than air.

6. The Mach-Zehnder interferometer type optical circuit as claimed in claim 1, further comprising a cover for covering said Mach-Zehnder interferometer type optical circuit, wherein pressure in a portion covered by said cover is lower than 1 atm.

7. The Mach-Zehnder interferometer type optical circuit, as claimed in claim 1, further comprising:
   a third Mach-Zehnder interferometer provided on a substrate, wherein a distance between said first Mach-Zehnder interferometer and said second Mach-Zehnder interferometer is shorter than a distance between two waveguide arms in said third Mach-Zehnder interferometer.

8. The Mach-Zehnder interferometer type optical circuit as claimed in claim 7, each of said Mach-Zehnder interferometer comprising a branch point in which a waveguide path and two waveguide arms are connected in a Y-shape;
   wherein said first Mach-Zehnder interferometer, said second Mach-Zehnder interferometer and said third Mach-Zehnder interferometer are arranged in parallel in a direction substantially perpendicular to the longitudinal direction of the waveguide path,
   and if a straight line were lined by connecting said branch point of said first Mach-Zehnder interferometer and said branch point of said second Mach-Zehnder interferometer, and divided into a side by said straight line at which there are waveguide arms of said first Mach-Zehnder interferometer and said second Mach-Zehnder interferometer, and a side at which there are no waveguide arms of said first Mach-Zehnder interferometer and said second Mach-Zehnder interferometer, said branch point of said third Mach-Zehnder interferometer exists at the side at which there are waveguide arms of said first Mach-Zehnder interferometer and said second Mach-Zehnder interferometer.

* * * * *